(12) United States Patent
Bespalovas et al.

(10) Patent No.: US 11,818,123 B1
(45) Date of Patent: Nov. 14, 2023

(54) OPTIMIZED ACCESS CONTROL SYSTEM

(71) Applicant: UAB 360 IT, Vilnius (LT)

(72) Inventors: Dovydas Bespalovas, Kaunas (LT); Mindaugas Valkaitis, Vilnius (LT)

(73) Assignee: UAB 360 IT, Vilnius (LT)

( * ) Notice: Subject to any disclaimer, the term of this patent is extended or adjusted under 35 U.S.C. 154(b) by 0 days.

(21) Appl. No.: 17/991,723

(22) Filed: Nov. 21, 2022

(51) Int. Cl.
*H04L 9/40* (2022.01)

(52) U.S. Cl.
CPC .................. *H04L 63/0853* (2013.01)

(58) Field of Classification Search
CPC .................................................. H04L 63/0853
USPC ............................................................ 726/4
See application file for complete search history.

(56) References Cited

U.S. PATENT DOCUMENTS

| | | | | |
|---|---|---|---|---|
| 2017/0063827 | A1* | 3/2017 | Ricardo | ................ H04L 63/083 |
| 2019/0052467 | A1* | 2/2019 | Bettger | ................ H04L 9/088 |

\* cited by examiner

*Primary Examiner* — Anthony D Brown
(74) *Attorney, Agent, or Firm* — The Pattani Law Group

(57) ABSTRACT

A method including transmitting, by an infrastructure device to a user device, an invitation link to enable the user device to receive network services from the infrastructure device; transmitting, by the infrastructure device to the user device based on verifying that the invitation link was activated by the user device, seed information to enable the user device to determine authentication information; determining, by the user device, the authentication information based on utilizing the seed information; transmitting, by the user device to the infrastructure device during a communication session, a user request related to an action to be performed regarding receiving the network services, the user request being signed based on utilizing a first portion of the authentication information; and authorizing, by the infrastructure device, the user request based on verifying that the communication session is currently active. Various other aspects are contemplated.

20 Claims, 9 Drawing Sheets

OPTIMIZED ACCESS CONTROL SYSTEM

FIELD OF DISCLOSURE

Aspects of the present disclosure generally relate to network services, and more particularly to providing an optimized access control system.

BACKGROUND

A user device may rely on a network to communicate information and/or to communicate messages with another user device. Such information and/or messages may include private information and/or sensitive data associated with the user device. The communication over the network may be vulnerable as being susceptible to a cybercrime, through which a malicious entity may attempt to steal, alter, disable, expose, or destroy the information through unauthorized access to the communicating user devices. A cybercrime may include, for example, a malware attack, a phishing attack, a ransomware attack, a virus attack, etc. As a result, cyber security measures may be used to prevent occurrence of the cybercrime and/or to mitigate risks associated with the cybercrime.

SUMMARY

In one aspect, the present disclosure contemplates a method including transmitting, by an infrastructure device to a user device, an invitation link to enable the user device to receive network services from the infrastructure device; transmitting, by the infrastructure device to the user device based at least in part on verifying that the invitation link was activated by the user device, seed information to enable the user device to determine authentication information; determining, by the user device, the authentication information based at least in part on utilizing the seed information; transmitting, by the user device to the infrastructure device during a communication session, a user request related to an action to be performed regarding receiving the network services, the user request being signed based at least in part on utilizing a first portion of the authentication information; and authenticating, by the infrastructure device, the user request based at least in part on verifying that the communication session is currently active.

In another aspect, the present disclosure contemplates a system including an infrastructure device; and a user device configured to receive network services provided by the infrastructure device, wherein the infrastructure device is configured to transmit, to the user device, an invitation link to enable the user device to receive the network services from the infrastructure device; the infrastructure device is configured to transmit, to the user device based at least in part on verifying that the invitation link was activated by the user device, seed information to enable the user device to determine authentication information; the user device is configured to determine the authentication information based at least in part on utilizing the seed information; the user device is configured to transmit, to the infrastructure device during a communication session, a user request related to an action to be performed regarding receiving the network services, the user request being signed based at least in part on utilizing a first portion of the authentication information; and the infrastructure device is configured to authenticate the user request based at least in part on verifying that the communication session is currently active.

In another aspect, the present disclosure contemplates a non-transitory computer readable medium storing instructions, which when executed by processors associated with an infrastructure device and a manager device, cause: the infrastructure device to transmit, to the user device, an invitation link to enable the user device to manage network services provided by the infrastructure device; the infrastructure device to transmit, to the user device based at least in part on verifying that the invitation link was activated by the user device, seed information to enable the user device to determine authentication information; the user device to determine the authentication information based at least in part on utilizing the seed information; the user device to transmit, to the infrastructure device during a communication session, a user request related to an action to be performed regarding receiving the network services, the user request being signed based at least in part on utilizing a first portion of the authentication information; and the infrastructure device to authenticate the user request based at least in part on verifying that the communication session is currently active.

Aspects generally include a method, an apparatus, a system, a device, a computer program product, a non-transitory computer-readable medium, a control infrastructure, a wireless communication device, and/or processing system as substantially described herein with reference to and as illustrated by the drawings and specification.

It is to be understood that both the foregoing general description and the following detailed description are exemplary and explanatory in nature and are intended to provide an understanding of the present disclosure without limiting the scope thereof. In that regard, additional aspects, features, and advantages of the present disclosure will be apparent to one skilled in the art from the following detailed description.

BRIEF DESCRIPTION OF THE DRAWINGS

The accompanying drawings illustrate aspects of systems, devices, methods, and/or mediums disclosed herein and together with the description, serve to explain the principles of the present disclosure. Throughout this description, like elements, in whatever aspect described, refer to common elements wherever referred to and referenced by the same reference number. The characteristics, attributes, functions, interrelations ascribed to a particular element in one location apply to those elements when referred to by the same reference number in another location unless specifically stated otherwise.

The figures referenced below are drawn for ease of explanation of the basic teachings of the present disclosure; the extensions of the figures with respect to number, position, relationship, and dimensions of the parts to form the following aspects may be explained or may be within the skill of the art after the following description has been read and understood. Further, exact dimensions and dimensional proportions to conform to specific force, weight, strength, and similar requirements will likewise be within the skill of the art after the following description has been read and understood.

The following is a brief description of each figure used to describe the present disclosure, and thus, is being presented for illustrative purposes only and should not be limitative of the scope of the present disclosure.

Figure 1:
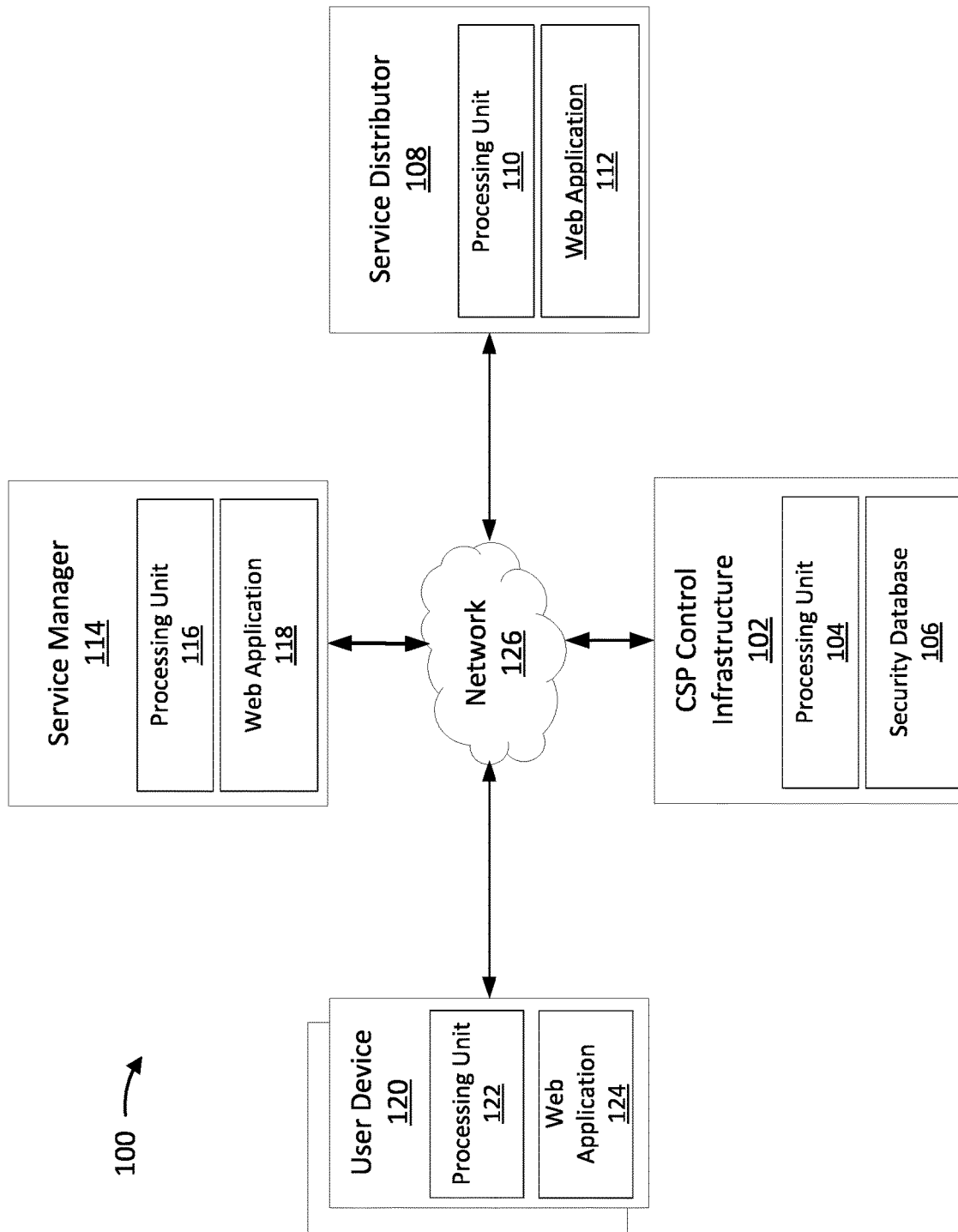

FIG. 1 is an illustration of an example system associated with providing an optimized access control system, according to various aspects of the present disclosure.

Figure 2:
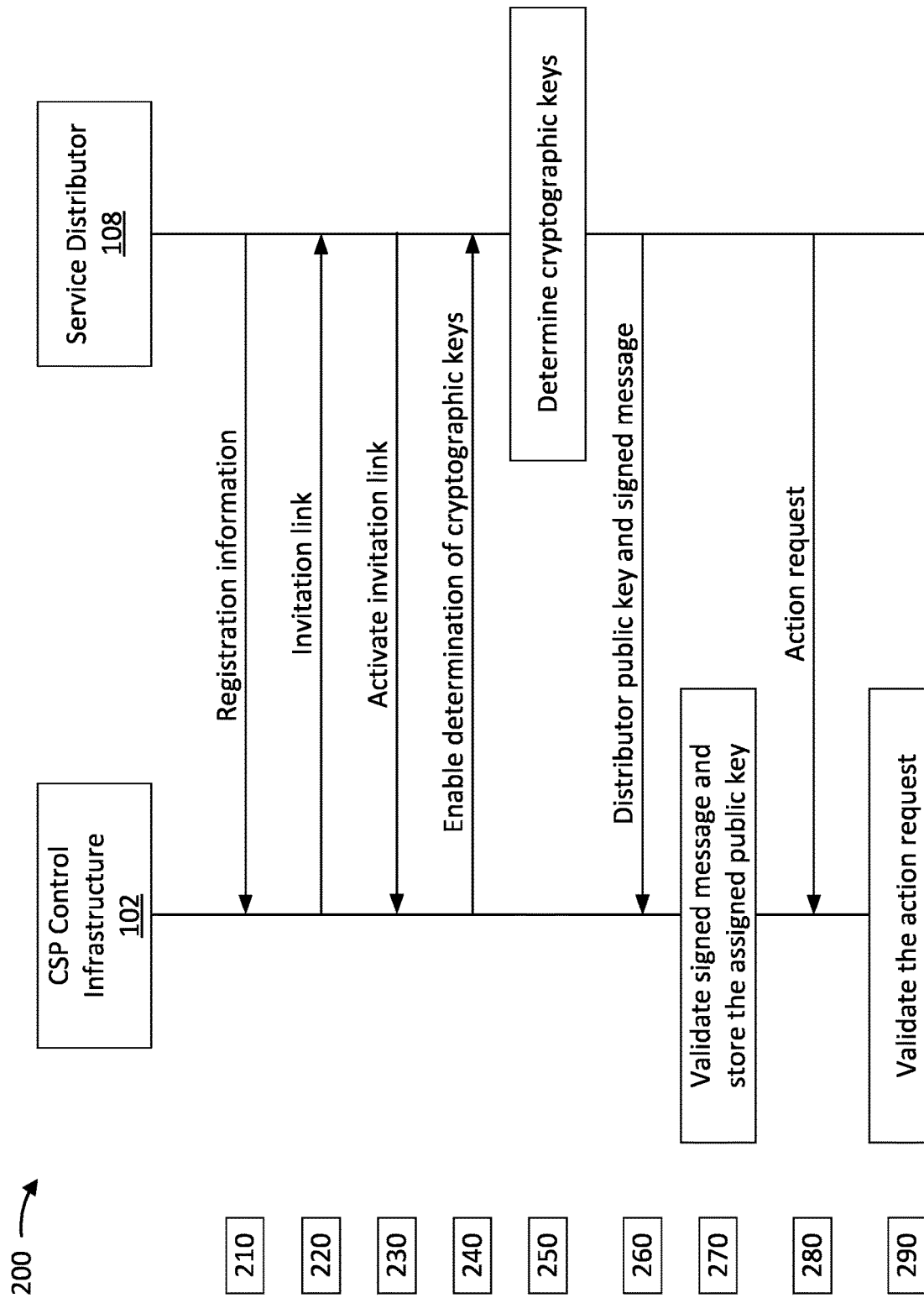

FIG. 2 is an illustration of an example flow associated with providing an optimized access control system, according to various aspects of the present disclosure.

Figure 3:
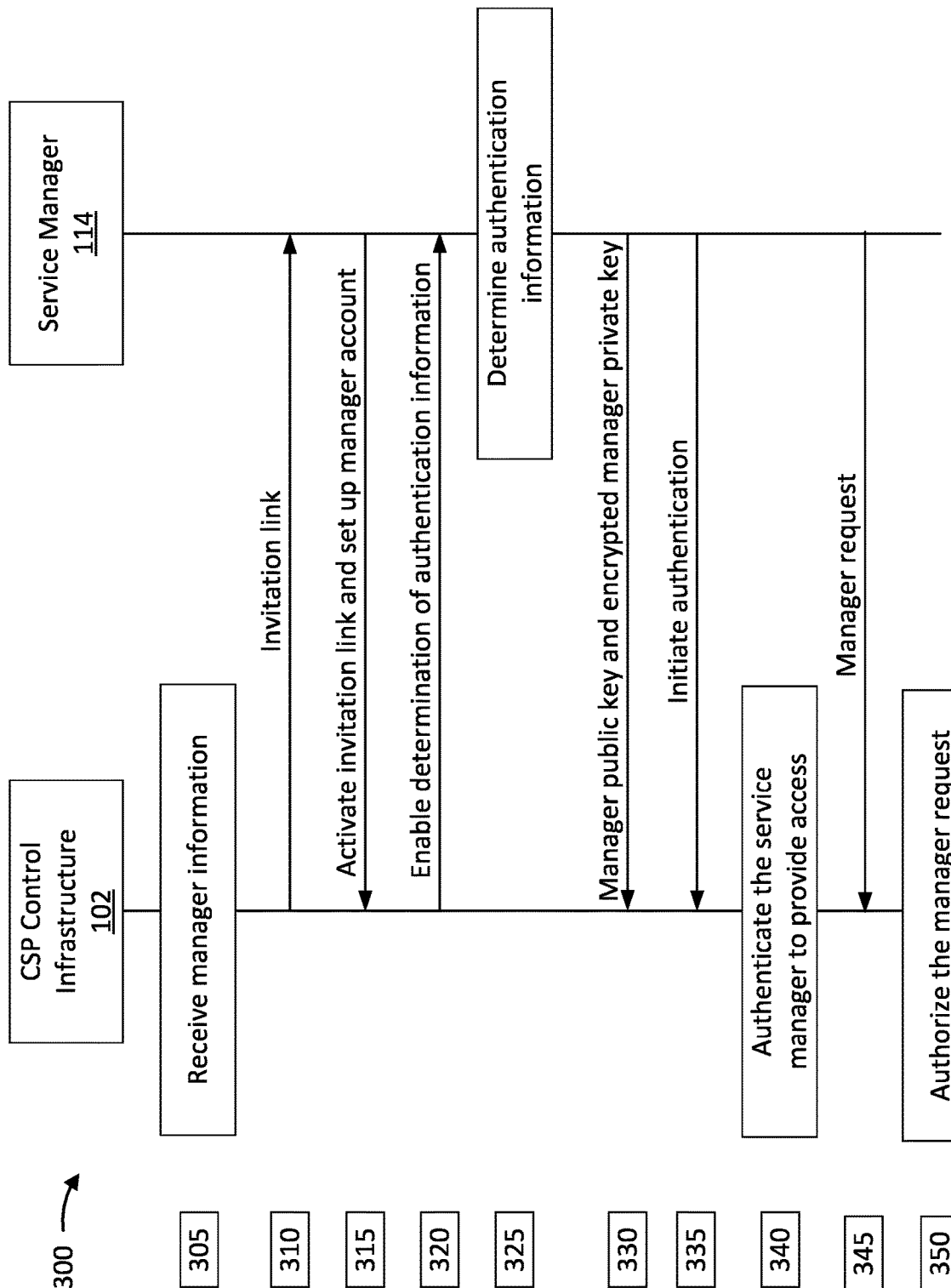

FIG. 3 is an illustration of an example flow associated with providing an optimized access control system, according to various aspects of the present disclosure.

Figure 4:
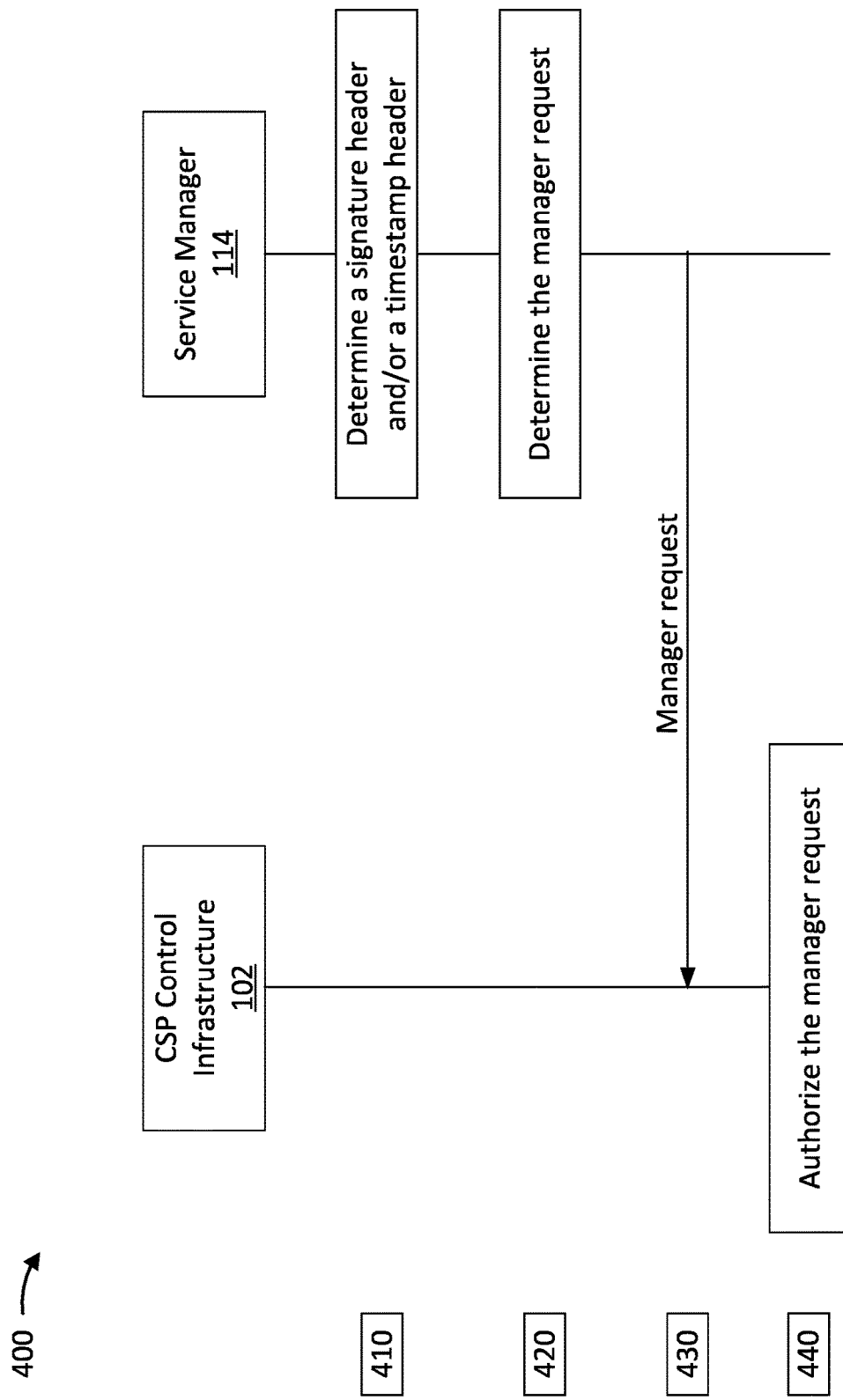

FIG. 4 is an illustration of an example flow associated with providing an optimized access control system, according to various aspects of the present disclosure.

Figure 5:
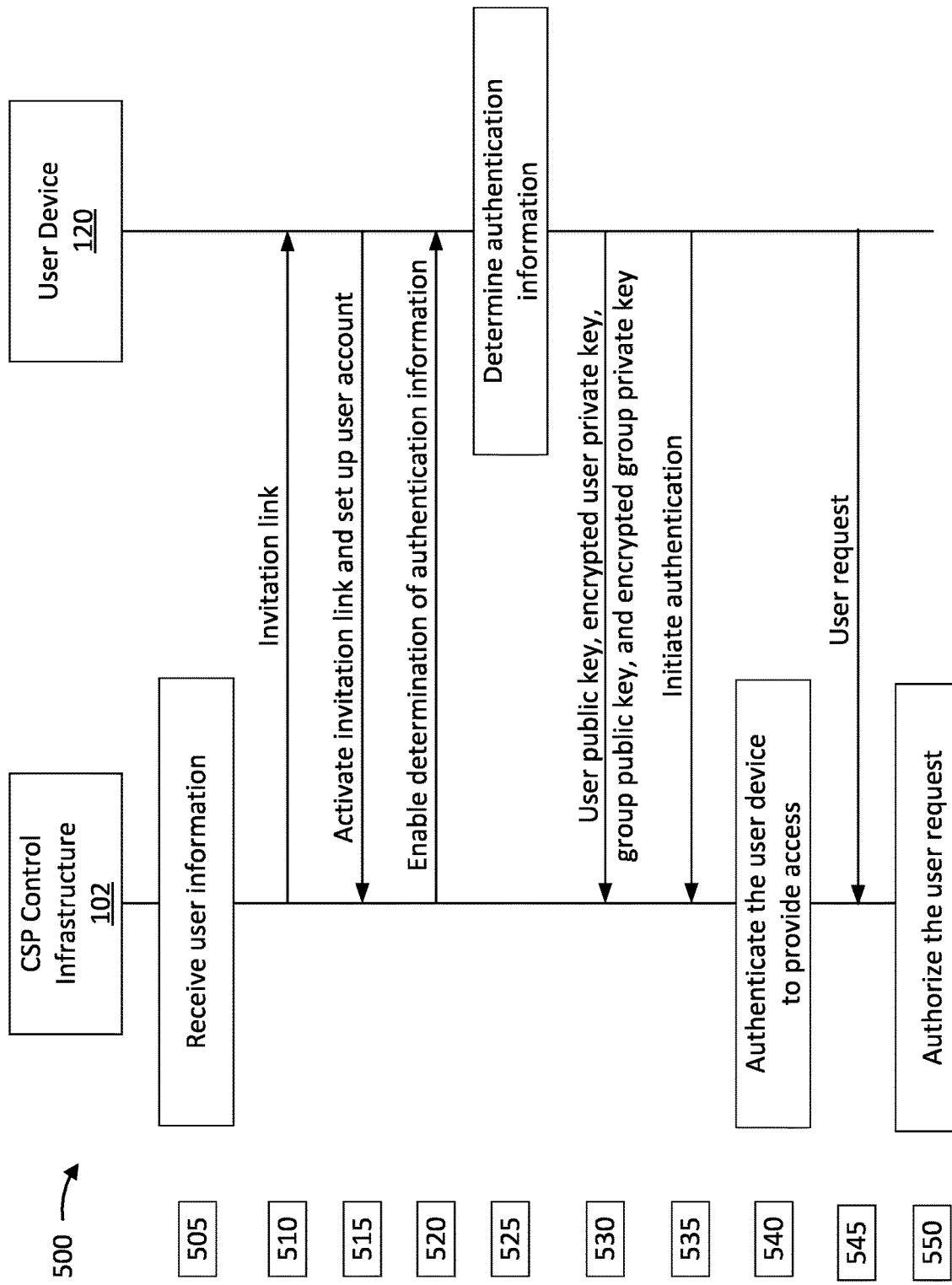

FIG. 5 is an illustration of an example flow associated with providing an optimized access control system, according to various aspects of the present disclosure.

Figure 6:
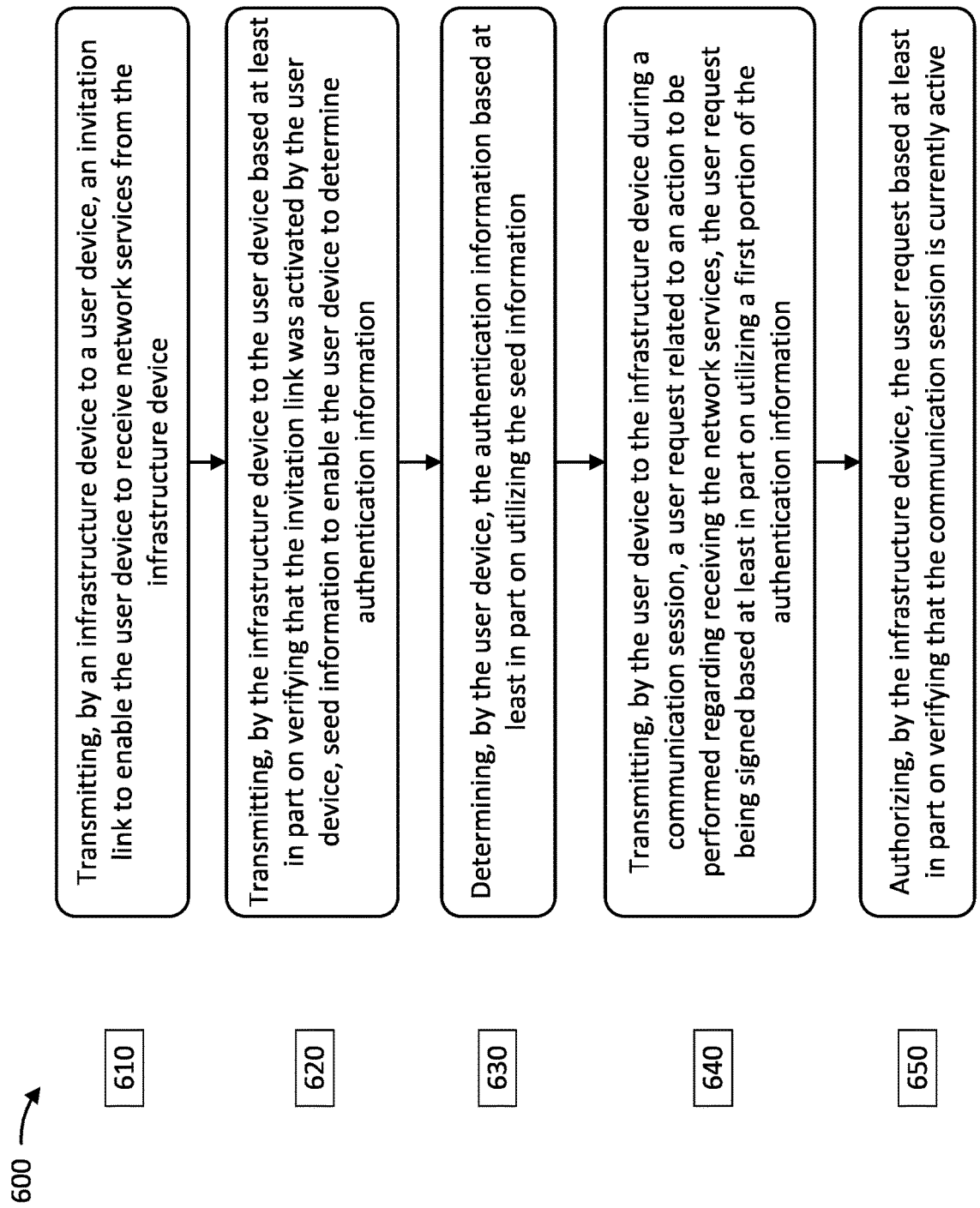

FIG. 6 is an illustration of an example process associated with providing an optimized access control system, according to various aspects of the present disclosure.

Figure 7:
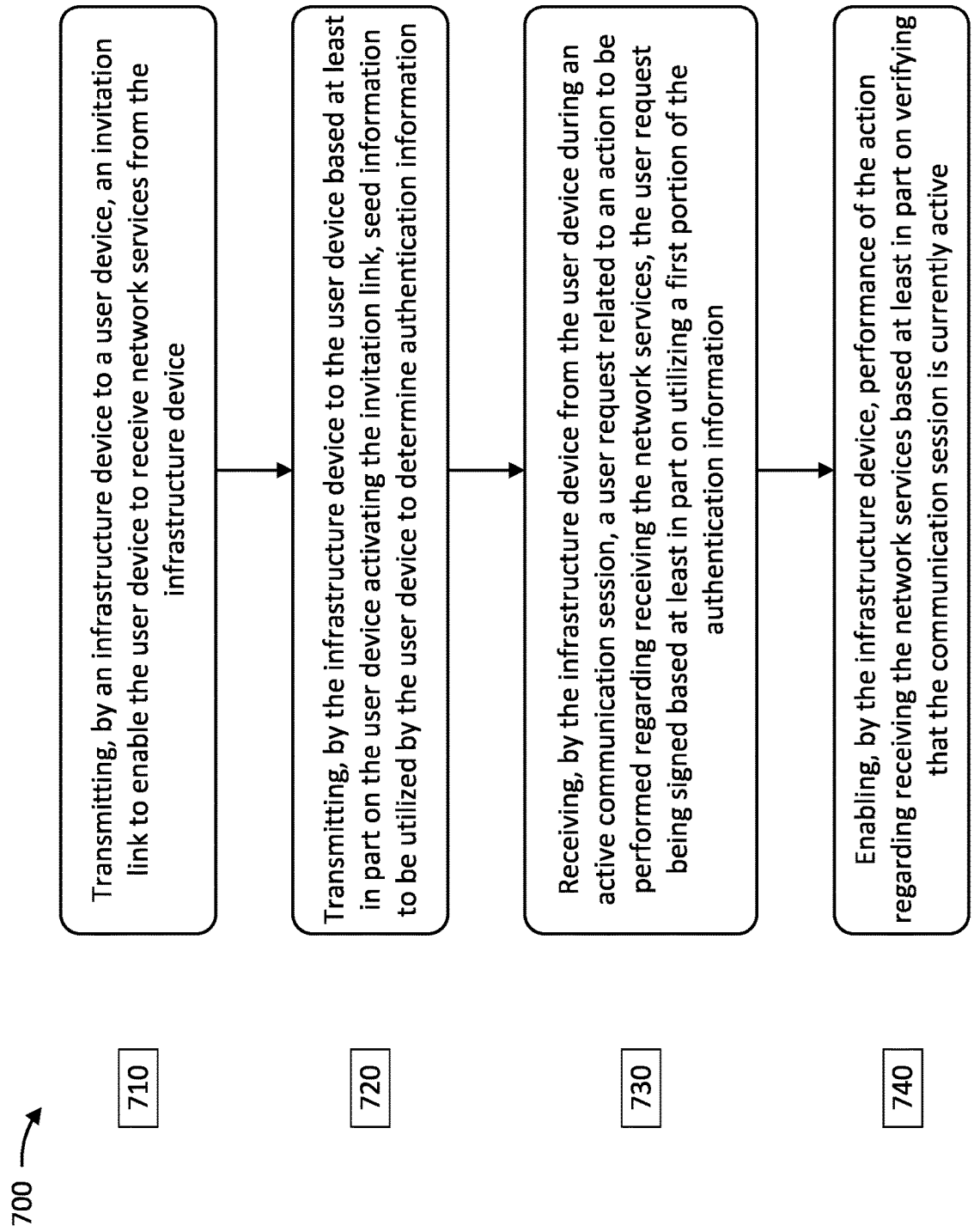

FIG. 7 is an illustration of an example process associated with providing an optimized access control system, according to various aspects of the present disclosure.

Figure 8:
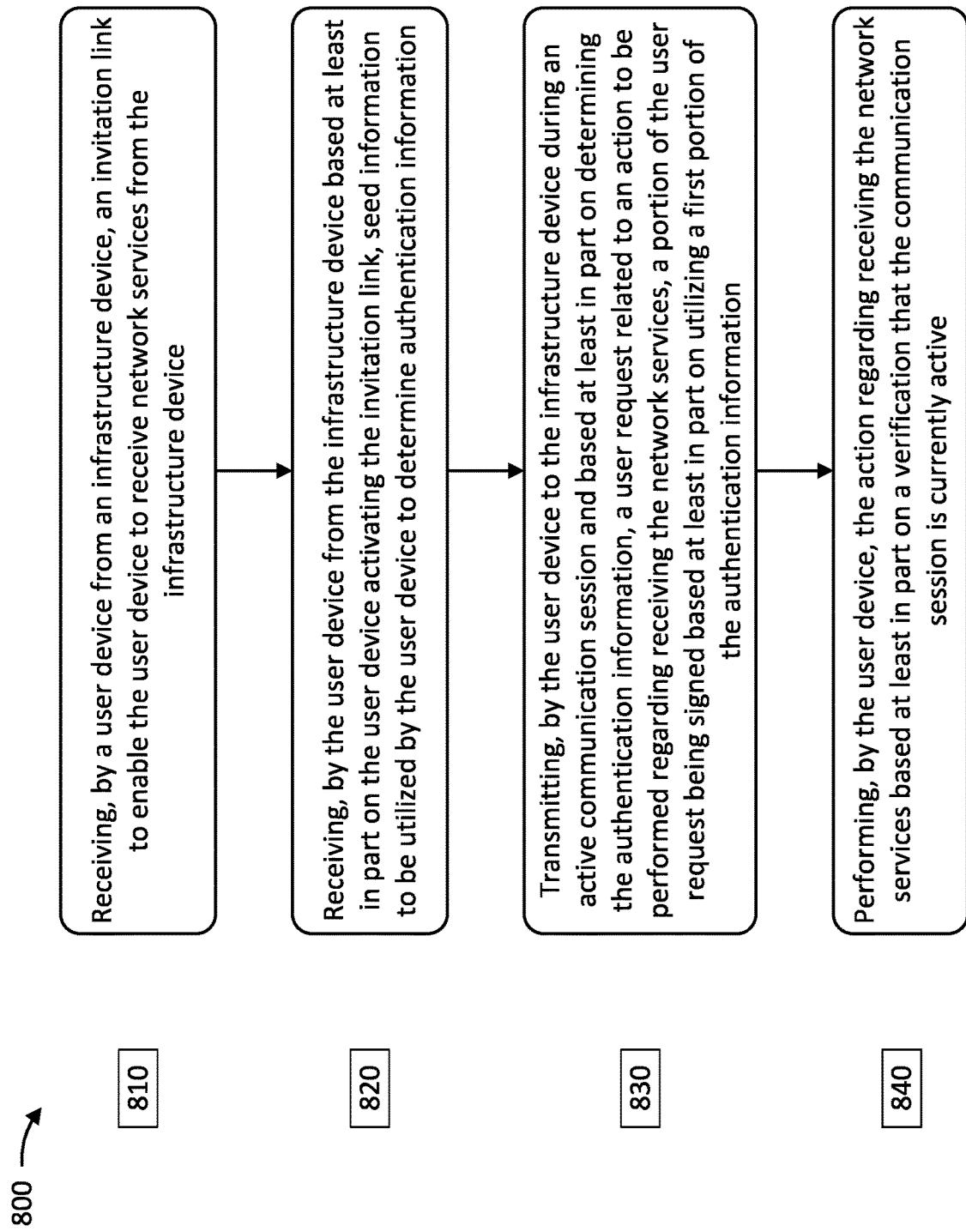

FIG. 8 is an illustration of an example process associated with providing an optimized access control system, according to various aspects of the present disclosure.

Figure 9:
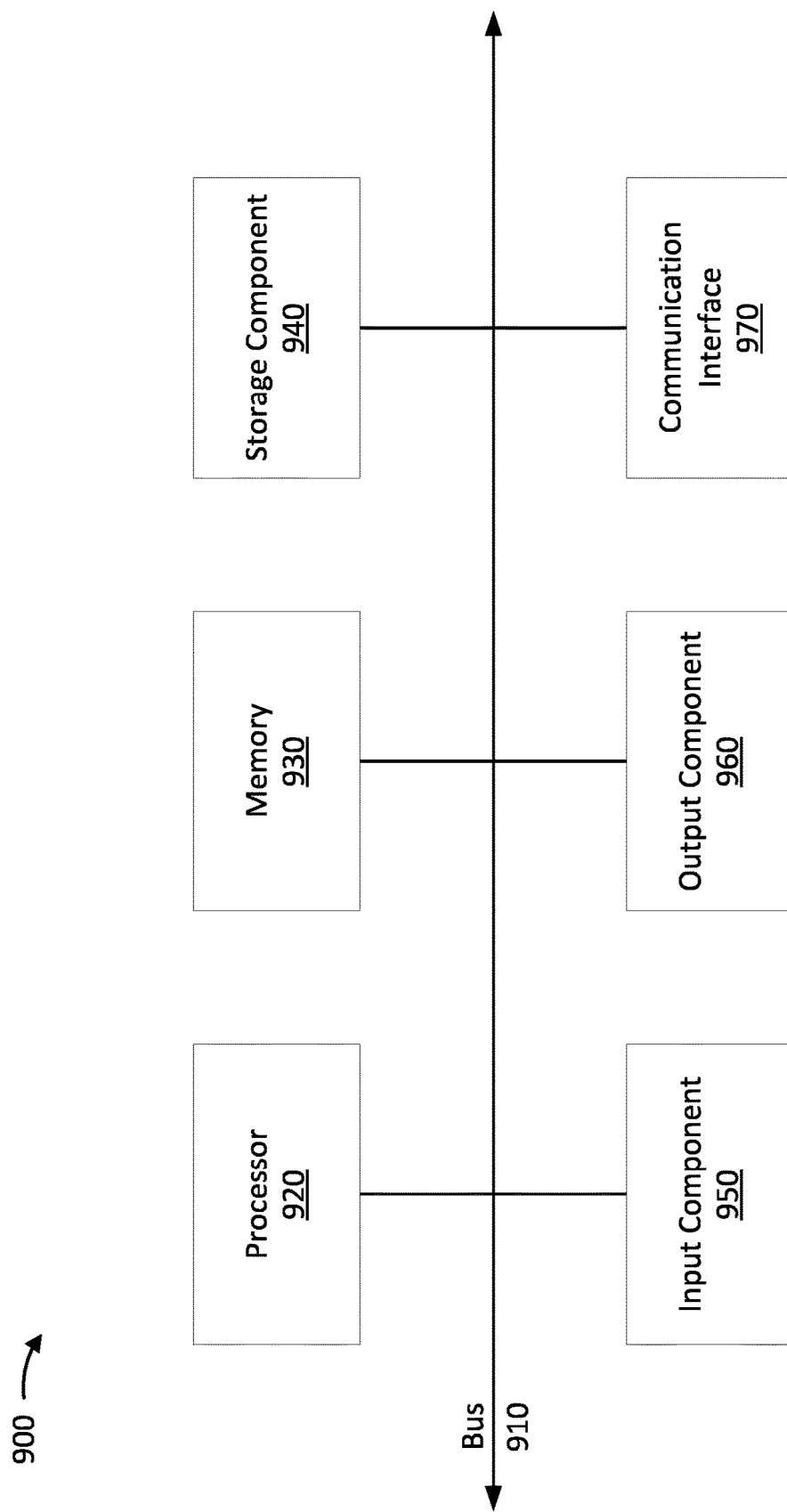

FIG. 9 is an illustration of example devices associated with providing an optimized access control system, according to various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

For the purposes of promoting an understanding of the principles of the present disclosure, reference will now be made to the aspects illustrated in the drawings, and specific language may be used to describe the same. It will nevertheless be understood that no limitation of the scope of the disclosure is intended. Any alterations and further modifications to the described devices, instruments, methods, and any further application of the principles of the present disclosure are fully contemplated as would normally occur to one skilled in the art to which the disclosure relates. In particular, it is fully contemplated that the features, components, and/or steps described with respect to one aspect may be combined with the features, components, and/or steps described with respect to other aspects of the present disclosure. For the sake of brevity, however, the numerous iterations of these combinations may not be described separately. For simplicity, in some instances the same reference numbers are used throughout the drawings to refer to the same or like parts.

FIG. 1 is an illustration of an example 100 associated with providing an optimized access control system, according to various aspects of the present disclosure. Example 100 shows an architectural depiction of included components. In some aspects, the components may include cyber security service provider (CSP) control infrastructure 102, a service distributor 108, a service manager 114, and one or more user devices 120 in communication with each other over a network 126. The CSP control infrastructure 102 may include a processing unit 104 and a security database 106 to enable provision of network services. The service distributor 108 may include a processing unit 110 and a web application 112 to enable the service distributor 108 to access and/or communicate with the CSP control infrastructure 102 regarding the network services. The service manager 114 may include a processing unit 116 and a web application 118 to enable the service manager 114 to access and/or communicate with the CSP control infrastructure 102 regarding the network services. The user device 120 may include a processing unit 122 and a web application 124 to enable the user device 120 to access and/or communicate with the CSP control infrastructure 102 and/or to enable reception of the network services.

In some aspects, the CSP control infrastructure 102 may be owned and operated by a cyber security service provider for purposes of, for example, providing network services. The CSP control infrastructure 102 may include a combination of hardware and software components that enable provision of the network services. As discussed below in further detail, the CSP control infrastructure 102 may interface with a web application installed on an entity (e.g., the service distributor, the service manager, and/or the user device 120). The CSP control infrastructure 102 may utilize an application programming interface (API) to interface with the web application, the API including one or more endpoints to a defined request-response message system. In some aspects, the API may be configured to receive, via the network, an access request from the entity to access the CSP control infrastructure 102 for purposes associated with provision of the network services. The access request may include an authentication request to authenticate the entity and/or to receive the network services.

The API may further be configured to handle the connection request(s) by mediating the authentication request. For instance, the API may receive from the entity credentials including, for example, a unique combination of a user ID and password for purposes of authenticating the entity. In another example, the credentials may include a unique validation code or a one-time passcode known to an authorized user. The API may provide the received credentials to the processing unit 104 for verification. The processing unit 104 may communicate with the security database 106 to authenticate the entity.

The security database 106 may include a structured repository of valid credentials belonging to authorized users. In one example, the structured repository may include one or more tables containing valid unique combinations of user IDs and passwords belonging to authorized users. In another example, the structured repository may include one or more tables containing valid unique validation codes or one-time passcodes associated with authorized users. The cyber security service provider may add or delete such valid unique combinations of user IDs and passwords from the structured repository at any time. Based at least in part on receiving the credentials from the API, the user database 106 and a processor (e.g., the processing unit 104 or another local or remote processor) may verify the received credentials by matching the received credentials with the valid credentials stored in the structured repository. In some aspects, the security database 106 and the processing unit 104 may authenticate the user device 120 when the received credentials match at least one of the valid credentials. In this case, the cyber security service provider may enable the CSP control infrastructure to provide access and/or the network services to the entity. When the received credentials fail to match at least one of the valid credentials, the user database 106 and the processor may fail to authenticate the entity. In this case, the cyber security service provider may enable the CSP control infrastructure to decline to provide access and/or the network services to the entity.

In some aspects, an entity may include a processing unit (e.g., processing unit 110, processing unit 116, processing unit 122). In some aspects, the processing unit may include a logical unit including a logical component configured to perform complex operations associated with computing, for example, numerical weights related to various factors associated with providing the network services. In some aspects, the processing unit may include processor 920 discussed below with respect to FIG. 9.

In some aspects, the entity may install an instance of a web application (e.g., web application 112, web application 118, web application 124). In an example, the web application may include a client application configured and provided by the CSP control infrastructure 102 to enable the entity to gain access to the CSP control infrastructure 102 and/or to obtain the network services. In another example, the web application may include a web browser configured by the CSP control infrastructure 102 to execute a cyber security script provided by the CSP control infrastructure 102 to enable the entity to gain access to the CSP control infrastructure 102 and/or to obtain the network services.

The service distributor 108 may utilize the processing unit 110 and/or the web application 112 to communicate with the CSP control infrastructure 102 regarding the network services. In an example, the service distributor 108 may establish a business relationship with the cyber security provider to enable distribution of the network services. For instance, the service distributor 108 may enable distribution of the network services to one or more user devices 120. In some aspects, the user devices 120 may be associated with individual users. In some aspects, the user devices 120 may be associated with a group of users such as, for example, employees of a company, members of a family, or the like. As discussed below in further detail with respect to FIG. 2, the CSP control infrastructure 102 may enable optimized control access by the service distributor 108 to the CSP control infrastructure 102.

The service distributor 108 may establish a business relationship with the service manager 114 for managing provision of the distributed network services. In an example, the service manager 114 may manage allocation of the network services among the one or more user devices 120. In another example, the service manager 114 may manage tiered access to the network services by the one or more user devices 120. For instance, the service manager 114 may enable a tier-1 user device 120 to access available network services and may enable a tier-2 user device 120 to access a subset of the available network services. As discussed below in further detail with respect to FIGS. 3 and 4, the CSP control infrastructure 102 may also enable optimized control access by the service manager 114 to the CSP control infrastructure 102.

A user device 120 may utilize the processing unit 122 and/or the web application 124 to access the CSP control infrastructure 102 and/or to obtain the network services. Non-limiting examples of the user device 120 include, for example, a laptop, a mobile phone, a tablet computer, a desktop computer, a server computer, a smart device, a router, an Internet-of-Things (IoT) device such as an MSP smart home appliance, a smart home security system, an autonomous vehicle, a smart health monitor, smart factory equipment, a wireless inventory tracker, a biometric scanner, or a combination thereof. As discussed below in further detail with respect to FIG. 5, the CSP control infrastructure 102 may also enable optimized control access by the user device 120 to the CSP control infrastructure 102.

The network 126 may include any digital network that permits several nodes to share and access resources. In some aspects, the network 126 may include one or more of, for example, a local-area network (LAN), a wide-area network (WAN), a campus-area network (CAN), a metropolitan-area network (MAN), a home-area network (HAN), Internet, Intranet, Extranet, and Internetwork.

One or more components (e.g., processing units, security database, web applications, etc.) included in example 100 shown in FIG. 1 may further be associated with a controller/processor, a memory, a communication interface, or a combination thereof (e.g., FIG. 9). For instance, the one or more components may include or may be included in a controller/processor, a memory, or a combination thereof. In some aspects, the one or more components included may be separate and distinct from each other. Alternatively, in some aspects, the one or more of the components may be combined with one or more of the other components. In some aspects, the one or more of the components may be local with respect to one or more of other components. Alternatively, in some aspects, the one or more of the components may be located remotely with respect to one or more of other components. Additionally, or alternatively, the one or more components may be implemented at least in part as software stored in a memory for execution by a processor. For example, a component (or a portion of a component) may be implemented as instructions or code stored in a non-transitory computer-readable medium and executable by a controller or a processor to perform the functions or operations of the component. Additionally, the one or more components may be configured to perform one or more functions described as being performed by another one or more of the components.

As indicated above, FIG. 1 is provided as an example. Other examples may differ from what is described with regard to FIG. 1.

To reduce occurrence of cybercrimes and/or to mitigate risks associated with cybercrimes, a cyber security provider may utilize a CSP control infrastructure to provide network services to user devices. Further, to reach a wider network of user devices, the cyber security provider may establish a business relationship with a service distributor that may enable the cyber security provider in distributing the network services. In some cases, the service distributor may own and operate a network platform (e.g., cloud-based platform) to enable the user devices to obtain the network services from the CSP control infrastructure. In an example, the user devices may utilize a network (e.g., Internet) to receive the network services from the CSP control infrastructure through the network platform. Further, the service distributor may establish a business relationship with a service manager that may manage provision of the distributed network services to the user devices.

In this case, the CSP control infrastructure, the service distributor, the service manager, and/or the user devices may communicate with each other access information associated with service distributor, the service manager, and/or the user devices accessing the CSP control infrastructure in connection with the network services. In some cases, the CSP control infrastructure may communicate access information with the service distributor (or service manager or user device) to enable the service distributor (or service manager or user device) to access the CSP control infrastructure. Similarly, the service distributor may communicate access information with the service manager to enable the service manager to access the CSP control infrastructure. Similarly, the service manager may communicate access information with the user devices to enable the user devices to access the CSP control infrastructure.

Utilization of the network platform by the service provider and/or communication of the access information among different entities may result in private information (e.g., identification information, contact information, financial information, location information, etc.) associated with the service distributor, the service manager, and/or the user devices becoming compromised. In an example, such utilization of the network platform and/or communication of the service information may involve unencrypted communication of the access information over the open Internet among the user devices, the service distributor, the service manager, and/or the CSP control infrastructure. A malicious party may monitor and/or intercept the unencrypted communication to gain unauthorized access to the access information. Further, the malicious party, while acting as the service distributor, the service manager, and/or user device, may utilize the access information to gain unauthorized access to the CSP control infrastructure. Based at least in part on gaining unauthorized access to the CSP control infrastructure, the malicious party may execute unauthorized requests to gain unauthorized access to the private information.

Based at least in part on gaining unauthorized access to the private information, the malicious party may gain unauthorized access to systems and/or devices associated with the service distributor, the service manager, the user devices, and/or the CSP control infrastructure. Based at least in part on gaining unauthorized access to the systems and/or devices, the malicious party may introduce malware in the systems and/or devices, the malware being designed to disrupt and/or damage operation of the systems and/or devices. In an example, the malware may adversely affect operating systems utilized by the systems and/or devices such that the operating systems may run slower and/or associated circuitry may emit excessive heat and/or noise, thereby causing damage. Further, the malware may execute unauthorized transmission and/or deletion of the private information from memories associated with the systems and/or devices.

The user devices, the service distributor, the service manager, and/or the CSP control infrastructure may expend various resources (e.g., processing resources, management resources, memory resources, bandwidth resources, network resources, financial resources, power consumption resources, battery life, or the like) in efforts to mitigate effects of the access information becoming compromised.

Various aspects of systems and techniques discussed in the present disclosure enable providing optimized access control system. In some aspects, a cyber security service provider may utilize a CSP control infrastructure to provide network services (e.g., cyber security services, data storage and protection services, or a combination thereof) to user devices. The network services may be distributed to the user devices by a service distributor and may be managed by a service manager. To facilitate protection of access information associated with the user devices, the CSP control infrastructure may implement the optimized access control. In some aspects, the optimized access control may include the CSP control infrastructure providing respective authentication mechanisms for the service distributor, the service manager, and/or the user devices to gain authorized access to the CSP control infrastructure. The authentication mechanisms may assist in ensuring that the service provider, the service manager, and/or the user devices receive access to the CSP control infrastructure while other parties (e.g., a malicious party) may be prevented from gaining unauthorized access to the CSP control infrastructure. In this way, the optimized access control may enable efficient utilization of resources (e.g., processing resources, management resources, memory resources, bandwidth resources, network resources, financial resources, power consumption resources, battery life, or the like) by the CSP control infrastructure, the service distributor, the service manager, and/or the user devices for more suitable tasks.

In some aspects, the present disclosure contemplates a system including an infrastructure device; and a manager device configured to manage network services provided by the infrastructure device, wherein the infrastructure device is configured to transmit, to the user device, an invitation link to enable the user device to receive the network services from the infrastructure device, the infrastructure device is configured to transmit, to the user device based at least in part on verifying that the invitation link was activated by the user device, seed information to enable the user device to determine authentication information, the user device is configured to determine the authentication information based at least in part on utilizing the seed information, the user device is configured to transmit, to the infrastructure device during a communication session, a user request related to an action to be performed regarding receiving the network services, the user request being signed based at least in part on utilizing a first portion of the authentication information; and the infrastructure device is configured to authenticate the user request based at least in part on verifying that the communication session is currently active.

FIG. 2 is an illustration of an example flow 200 associated with providing an optimized access control system, according to various aspects of the present disclosure. The example flow 200 may include a CSP control infrastructure (e.g., CSP control infrastructure 102) and a service distributor (e.g., service distributor 108) in communication with each other over a network 126. The CSP control infrastructure 102 may include a processing unit 104 and a security database 106 to enable provision of the network services. The service distributor 108 may include a processing unit 110 and a web application 112 to enable access by the service distributor 108 to the CSP control infrastructure 102 and/or to enable receipt of the network services.

In some aspects, the web application 112 may enable the service distributor 108 to receive information to be processed by the web application 112 and/or by the CSP control infrastructure 102. The web application 112 may include a graphical user interface to receive the information via a local input interface (e.g., touch screen, keyboard, mouse, pointer, etc.) associated with the service distributor 108. The information may be received via text input or via a selection from among a plurality of options (e.g., pull down menu, etc.). In some aspects, the web application 112 may activate and/or enable, at an appropriate time, the graphical interface for receiving the information. For instance, the web application 112 may cause a screen (e.g., local screen) associated with the service distributor 108 to display, for example, a pop-up message to request entry of the information. Further, the web application 112 may enable transmission of at least a portion of the information to the CSP control infrastructure 102. In some aspects, the web application 112 may utilize a processing unit (e.g., processing unit 110, processor 720) associated with the service distributor 108 to perform processes/operations associated with classification of the data files.

In some aspects, as discussed elsewhere herein, the CSP control infrastructure 102 and the service distributor 108 may enter into a business relationship regarding distribution of network services provided by the CSP control infrastructure 102. As shown by reference numeral 210, the service distributor 108 may register a distributor account with the CSP control infrastructure 102. During registration, the service distributor 108 may provide registration information to the CSP control infrastructure 102. Such registration information may include, for example, identification information associated with the service distributor 108, contact information associated with the service distributor 108 (e.g., a phone number, an email address, or the like), financial information (e.g., bank account number), or a combination thereof.

Based at least in part on receiving the registration information, as shown by reference numeral 220, the CSP control infrastructure 102 may determine and transmit an invitation link to the service distributor 108. The CSP control infrastructure 102 may utilize the contact information (e.g., email address) associated with the service distributor 108 to transmit the invitation link. The invitation link may include a uniform resource locator (URL) associated with a uniform resource identifier (URI).

In some aspects, the invitation link may include a static portion and a dynamic portion. In an example, the invitation link may be in the form of (static portion)(dynamic portion). The static portion may remain constant for invitation links determined with respect to inviting service distributors (e.g., service distributor 108) to access the CSP control infrastructure 102. In some aspects, the CSP control infrastructure 102 may configure the static portion to include routing information to enable routing of the service distributor 108 to a server associated with the CSP control infrastructure 102.

The dynamic portion may be time-specific and/or recipient-specific (e.g., unique to the service distributor 108). In some aspects, the dynamic portion may be determined randomly utilizing time-specific information and/or recipient-specific information. When the dynamic portion is time-specific, the CSP control infrastructure 102 may determine the time-specific dynamic portion to include a unique time identifier identifying a point in time utilizing a UNIX time system (e.g., Epoch time, Posix time, etc.). In some aspects, the identified point in time may be associated with a point in time when the invitation link is determined. In some aspects, the identified point in time may be associated with a point in time and/or a duration of time indicating an expiration time before which the invitation link is to be utilized by the service distributor 108 to access the CSP control infrastructure 102. In some aspects, when the dynamic portion is time-specific, the invitation link may be configured to be utilized a limited number of times. In some aspects, the invitation link may include rate-limiting properties such that the invitation link may be utilized the limited number of times prior to the expiration time. In an example, the CSP control infrastructure 102 may determine the unique time identifier based at least in part on encoding information indicating the identified point in time, the limited number of times, and/or the rate limiting properties into a unique string of alphanumeric and/or special characters.

When the dynamic portion is recipient-specific, the CSP control infrastructure 102 may determine the recipient-specific dynamic portion based at least in part on determining a unique recipient identifier that identifies the service distributor 108. To determine the unique recipient identifier, the CSP control infrastructure 102 may utilize at least a portion of the identification information received along with the registration information from the service distributor 108. In an example, the CSP control infrastructure 102 may encode the identification information into a unique string of alphanumeric and/or special characters to determine the unique recipient identifier.

In some aspects, the invitation link may be in the form of, for example, https://CSPcontrolinfrastructure.com/invitation/74obUbN2et6fYKqd70vNHRVXoONh4wyrUqg=, where https://CSPcontrolinfrastructure.com/webview/ may include the static portion and 74obUbN2et6fYKqd70vNHRVXoUKDaWICgONh4wyrUqg=may be the dynamic portion (e.g., unique time identifier and/or unique recipient identifier).

In some aspects, the invitation link may be in the form of, for example, https://CSPcontrolinfrastructure.com/invitation/HFTGKVBKDHRUVWTDDHPXQPBASRQBCFYT, or https://CSPcontrolinfrastructure.com/invitation/DCsMGVnkeKLMfx3FkCcDxbQgJUHHuEb5, or https://CSPcontrolinfrastructure.com/invitation/2b9f7a72-f4a8-46f8-b38c-ad50dcdd78a7.

In some aspects, the CSP control infrastructure 102 may correlate and store information included in the invitation link in association with the service distributor 108 and/or the registered distributor account. In this way, when the invitation link is activated, the CSP control infrastructure 102 may determine that the invitation link was activated by the service distributor 108 and is associated with the registered distributor account. Further, when the invitation link is activated, the CSP control infrastructure 102 may determine whether the invitation link was activated in compliance with the expiration time and/or in compliance with the limited number of times and/or in compliance with the rate-limiting properties.

Based at least in part on receiving the invitation link, as shown by reference numeral 230, the service distributor 108 may activate the invitation link. In some aspects, the service distributor 108 may utilize the web application 112 to activate the invitation link. In this case, the CSP control infrastructure 102 may determine that the invitation link was activated by the service distributor 108 and may verify that the invitation link was activated in compliance with the expiration time and/or in compliance with the limited number of times and/or in compliance with the rate-limiting properties.

Based at least in part on a successful verification, as shown by reference numeral 240, the CSP control infrastructure 102 may enable the web application 112 and/or the service distributor 108 to determine distributor cryptographic keys. In an example, when the web application 112 includes a client application configured and provided by the CSP control infrastructure 102, the CSP control infrastructure 102 may transmit activation information to activate a configured functionality within the client application to determine the distributor cryptographic keys. Alternatively, configuration of the client application by the CSP control infrastructure may enable automatic activation of the functionality to determine the distributor cryptographic keys based at least in part on receipt of certain information (e.g., master password, etc.) by the web application 112. In another example, when the web application 112 includes a web browser, the CSP control infrastructure 102 may transmit a script to be executed by the web browser on the service distributor 108 to determine the distributor cryptographic keys. In some aspects, the CSP control infrastructure may transmit unique information (e.g., identification information, contact information, etc., or a combination thereof) associated with the service distributor 108 to be used as seed information for determining the distributor cryptographic keys, thereby enabling the distributor cryptographic keys to be unique to the service distributor 108.

Based at least in part on being enabled, as shown by reference numeral 250, the web application 112 installed on the service distributor 108 may determine and assign an asymmetric distributor key pair to the service distributor 108 and/or to the registered distributor account. In some aspects, the web application 112 may utilize the seed information for determining the distributor key pair, as indicated by the CSP control infrastructure 102. The distributor key pair may be unique to the service distributor 108 and/or to the registered distributor account. The distributor public key and the distributor private key may be associated with each other via, for example, a mathematical function. As a result, data encrypted using the distributor public key may be decrypted by utilizing the distributor private key. Similarly, data signed using the distributor private key may be validated by utilizing the distributor public key.

Based at least in part on determining the distributor key pair, as shown by reference numeral 260, the web application 112 and/or the service distributor 108 may transmit the distributor public key to the CSP control infrastructure 102. In some aspects, the distributor public key may be transmitted in association with a message signed by using the distributor private key. In some aspects, the distributor public key may be transmitted along with the message signed by using the distributor private key. In some aspects, the service distributor 108 may utilize an algorithm such as, for example, a cryptography algorithm (e.g., Ed25519 or EdDSA), the RSA algorithm (e.g., RSA), or the like along with the distributor private key to sign the message.

Based at least in part on receiving the distributor public key in association with the signed message, as shown by reference numeral 270, the CSP control infrastructure 102 may validate the signed message. In some aspects, the CSP control infrastructure 102 may utilize the distributor public key to validate the signed message. When the signed message is signed using the distributor private key, that is associated with the distributor public key, the CSP control infrastructure 102 may successfully validate the signed message. In this case, the CSP control infrastructure 102 may determine that the service distributor 108, that activated the invitation link and transmitted the signed message, is in possession of the distributor private key. Based at least in part on determining that the service distributor 108 is in possession of the distributor private key, the CSP control infrastructure 102 may store the distributor public key in correlation with the service distributor 108 and/or the registered distributor account.

When the service distributor 108 is to access the CSP control infrastructure 102, as shown by reference numeral 280, the service distributor 108 may utilize the web application 112 to transmit an action request to an application programming interface (API) associated with the CSP control infrastructure 102. In some aspects, the action request may be associated with requesting an action to be performed in connection with distributing the network services. The service distributor 108 may utilize the web application 112 to transmit the action request, which may include an Internet protocol (IP) packet. In some aspects, the IP packet may enable the service distributor 108 to, for example, call a function related to the action to be performed in connection with distributing the network services. Some examples of actions to be performed in connection with distributing the network services include registering a service manager (e.g., service manager 114) associated with the service distributor 108, reviewing user data associated with usage of network services by user devices associated with the service distributor 108, reviewing financial information, or the like.

In some aspects, to enable authentication of the action request with the CSP control infrastructure 102, the service distributor 108 may include a web token in the IP packet. The web token may include authentication information to be utilized by the CSP control infrastructure 102 to authenticate the action request. Such authentication information may include, for example, identification information regarding the service distributor 108, information regarding a point in time when the web token was created, information regarding a point in time when the web token was signed, or a combination thereof. In an example, the service distributor 108 may include the web token in a header included in the IP packet. In another example, the service distributor 108 may include the web token in a payload included in the IP packet. In some aspects, the web token may include a JSON web token (JWT). Further, the service distributor 108 may sign the request by using the distributor private key.

In some aspects, every action request from the service distributor 108 may be authenticated by the CSP control infrastructure 102. In other words, for every action request, the service distributor 108 may determine and transmit a respective IP packet including a respective web token, with the action request being signed by using the distributor private key.

Based at least in part on receiving the action request, as shown by reference numeral 290, the CSP control infrastructure 102 may validate the action request. In some aspects, the CSP control infrastructure 102 may receive the IP packet and may extract the signed web token from the header or the payload included in the IP packet. Further, the CSP control infrastructure 102 may receive the identification information associated with the service provider 108 from the extracted web token. Based at least in part on analyzing the identification information, the CSP control infrastructure 102 may determine that the action request is transmitted by the service distributor 108. In this case, the CSP control infrastructure 102 may retrieve the distributor public key stored in correlation with the service distributor 108 and/or the registered distributor account associated with the service distributor 108.

The CSP control infrastructure 102 may utilize the retrieved distributor public key to validate the signed action request. When the action request is signed using the distributor private key, that is associated with the distributor public key, the CSP control infrastructure 102 may successfully validate the signed action request. In this case, the CSP control infrastructure 102 may determine that the service distributor 108, that transmitted the action request, is in possession of the distributor private key and/or is the same service distributor 108 associated with the registered distributor account. In other words, the CSP control infrastructure 102 may determine that the service distributor 108 is authorized to make the action request. As a result, the CSP control infrastructure 102 may enable the service distributor 108 to perform the requested action and/or the CSP control infrastructure 102 may perform the requested action.

In this way, by utilizing the optimized access control, as discussed herein, the CSP control infrastructure may mitigate instances of a malicious party gaining unauthorized access to the CSP control infrastructure, the service distributor, the service manager, and/or the user devices. Further, the CSP control infrastructure may mitigate instances of private information associated with the user devices becoming compromised. As a result, the optimized access control may enable efficient utilization of resources (e.g., processing resources, management resources, memory resources, bandwidth resources, network resources, financial resources, power consumption resources, battery life, or the like) by the CSP control infrastructure, the service distributor, the service manager, and/or the user devices for more suitable tasks.

As indicated above, FIG. 2 is provided as an example. Other examples may differ from what is described with regard to FIG. 2.

FIG. 3 is an illustration of an example flow 300 associated with providing an optimized access control system, according to various aspects of the present disclosure. The example flow 300 may include a CSP control infrastructure (e.g., CSP control infrastructure 102) and a service manager (e.g., service manager 114) in communication with each other over a network 126. The CSP control infrastructure 102 may include a processing unit 104 and a security database 106 to enable provision of the network services. The service manager 114 may include a processing unit 116 and a web application 118 to enable access by the service manager 114 to the CSP control infrastructure 102 and/or to enable receipt of the network services.

In some aspects, the web application 118 may enable the service manager 114 to receive information to be processed by the web application 118 and/or by the CSP control infrastructure 102. The web application 118 may include a graphical user interface to receive the information via a local input interface (e.g., touch screen, keyboard, mouse, pointer, etc.) associated with the service manager 114. The information may be received via text input or via a selection from among a plurality of options (e.g., pull down menu, etc.). In some aspects, the web application 118 may activate and/or enable, at an appropriate time, the graphical interface for receiving the information. For instance, the web application 118 may cause a screen (e.g., local screen) associated with the service manager 114 to display, for example, a pop-up message to request entry of the information. Further, the web application 118 may enable transmission of at least a portion of the information to the CSP control infrastructure 102. In some aspects, the web application 118 may utilize a processing unit (e.g., processing unit 106, processor 720) associated with the service manager 114 to perform processes/operations associated with the improved access control.

In some aspects, as discussed elsewhere herein, the service distributor 108 may establish a business relationship with the service manager 114 for managing provision of the distributed network services. In an example, the service manager 114 may manage allocation of the network services among the one or more user devices 120. In another example, the service manager 114 may manage tiered access to the network services by the one or more user devices 120. For instance, the service manager 114 may enable a tier-1 user device 120 to access available network services and may enable a tier-2 user device 120 to access a subset of the available network services.

The CSP control infrastructure 102 may enable optimized control access by the service manager 114 to the CSP control infrastructure 102. In some aspects, as shown by reference numeral 305, the CSP control infrastructure 102 may receive manager information associated with the service manager 114 from the service distributor 108. Such manager information may include, for example, identification information, contact information (e.g., a phone number, an email address, or the like), financial information (e.g., bank account number), or a combination thereof.

Based at least in part on receiving the manager information, as shown by reference numeral 310, the CSP control infrastructure 102 may determine and transmit an invitation link to the service manager 114. The CSP control infrastructure 102 may utilize the contact information (e.g., email address) associated with the service manager 114 to transmit the invitation link. The invitation link may include a uniform resource locator (URL) associated with a uniform resource identifier (URI).

In some aspects, the invitation link may include a static portion and a dynamic portion. In an example, the invitation link may be in the form of (static portion)(dynamic portion). The static portion may remain constant for invitation links determined with respect to inviting service managers (e.g., service manager 114) to access the CSP control infrastructure 102. In some aspects, the CSP control infrastructure 102 may configure the static portion to include routing information to enable routing of the service manager 114 to a server associated with the CSP control infrastructure 102.

The dynamic portion may be time-specific and/or recipient-specific (e.g., unique to the service manager 114). When the dynamic portion is time-specific, the CSP control infrastructure 102 may determine the time-specific dynamic portion to include a unique time identifier identifying a point in time utilizing, for example, a UNIX time system (e.g., Epoch time, Posix time, etc.). In some aspects, the identified point in time may be associated with a point in time when the invitation link is determined. In some aspects, the identified point in time may be associated with a point in time and/or a duration of time indicating an expiration time before which the invitation link is to be activated by the service manager 114 to access the CSP control infrastructure 102. In some aspects, when the dynamic portion is time-specific, the invitation link may be configured to be utilized a limited number of times. The rate-limiting properties may also mitigate instances of a malicious party gaining unauthorized access via the invitation link (e.g., guess, brute force, etc.). In an example, the CSP control infrastructure 102 may determine the unique time identifier based at least in part on encoding information indicating the identified point in time, the limited number of times, and/or the rate limiting properties into a unique string of alphanumeric and/or special characters.

When the dynamic portion is recipient-specific, the CSP control infrastructure 102 may determine the recipient-specific dynamic portion based at least in part on determining a unique recipient identifier that identifies the service manager 114. To determine the unique recipient identifier, the CSP control infrastructure 102 may utilize at least a portion of the identification information received along with the manager information from the service distributor 108. In an example, the CSP control infrastructure 102 may encode the identification information into a unique string of alphanumeric and/or special characters to determine the unique recipient identifier.

In some aspects, the invitation link may be in the form of, for example, https://CSPcontrolinfrastructure.com/webview/M74ob-UbN2et6fYKqd70vNHRV XoONh4wyrUqg= where https://CSPcontrolinfrastructure.com/webview/ may include the static portion and M74obUb-N2et6fYKqd70vNHRVXoUKDaWICgONh4wyrUqg=may be the dynamic portion (e.g., unique time identifier and/or unique recipient identifier).

In some aspects, the CSP control infrastructure 102 may correlate and store information included in the invitation link in association with the manager information associated with the service manager 114. In this way, when the invitation link is activated, the CSP control infrastructure 102 may determine that the invitation link was activated by the service manager 114. Further, when the invitation link is activated, the CSP control infrastructure 102 may verify whether the invitation link was activated in compliance with the expiration time and/or in compliance with the limited number of times and/or in compliance with the rate-limiting properties.

Based at least in part on receiving the invitation link, as shown by reference numeral 315, the service manager 114 may activate the invitation link to access the CSP control infrastructure 102. In some aspects, the service manager 114 may utilize the web application 118 to activate the invitation link. In this case, the CSP control infrastructure 102 may determine that the invitation link was activated by the service manager 114 and may verify that the invitation link was activated in compliance with the expiration time and/or in compliance with the limited number of times and/or in compliance with the rate-limiting properties, as discussed elsewhere herein.

Based at least in part on activating the link, the service manager 114 may set up a manager account with the CSP control infrastructure 102. To set up the manager account, the service manager 114 may utilize the web application 118. In some aspects, the service manager 114 may set up a login system including registering a unique combination of a username and/or a password (e.g., login information) in association with the manager account. In some aspects, the CSP control infrastructure 102 may associate the manager account associated with the service manager 114 with the service distributor 108. As a result, the service distributor 108 may have authorized access to review information associated with network services managed by the service manager 114 and/or information associated with network services received by the service manager 114.

Based at least in part on the service manager 114 logging into the manager account, as shown by reference numeral 320, the CSP control infrastructure 102 may authenticate login information and enable the service manager 114 to determine authorization information. In an example, when the web application 118 includes a client application configured and provided by the CSP control infrastructure 102, the CSP control infrastructure 102 may transmit activation information (e.g., enabling information) to activate a configured functionality within the client application to determine the authorization information. Alternatively, configuration of the client application by the CSP control infrastructure 102 may enable automatic activation of the functionality to determine the authorization information based at least in part on receipt of certain information (e.g., master password, etc.) by the client application. In another example, when the web application 118 includes a web browser, the CSP control infrastructure 102 may transmit a script (e.g., enabling information) to be executed by the web browser on the service manager 114 to determine the authorization information. In some aspects, the CSP control infrastructure may transmit unique information (e.g., identification information, contact information, etc., or a combination thereof) associated with the service manager 114 to be used as seed information for determining the authorization information, thereby enabling the authorization information to be unique to the service manager 114.

The authorization information may include, for example, an asymmetric manager key pair, a master password, and/or a master key. For instance, based at least in part on receiving the seed information, as shown by reference numeral 325, the service manager 114 may determine an asymmetric manager key pair associated with the service manager 114 and/or the manager account. In other words, the manager key pair may be unique to the service manager 114 and/or the manager account. The manager key pair may include a manager public key and a manager private key. The manager public key and the manager private key may be associated with each other via, for example, a mathematical function. As a result, data encrypted using the manager public key may be decrypted by utilizing the manager private key. Further, data signed using the manager private key may be validated by utilizing the manager public key.

The service manager 114 may also determine the master password including a master string of alphanumeric characters. In some aspects, the master string may be based at least in part on the seed information and may be unique to the service manager 114 and/or the manager account. Based at least in part on receiving the master string, the service manager 114 may utilize the web application 118 to determine a master key. In some aspects, the service manager 114 may utilize a password derivation function and/or a key derivation function to determine the master key based at least in part on the master string. The password derivation function and/or the key derivation function may perform password hashing to determine the master key. The web application 118 may utilize the master key to encrypt the manager private key.

As shown by reference numeral 330, the service manager 114 may transmit, and the CSP control infrastructure 102 may receive, at least a portion of the information determined by the service manager 114. For instance, the service manager 114 may transmit, for example, the manager public key and the encrypted manager private key to the CSP control infrastructure 102. The CSP control infrastructure 102 may store the received information in association with the manager information and/or the service manager 114 and/or the manager account associated with the service manager 114.

When the service manager 114 is to access the CSP control infrastructure 102, as shown by reference numeral 335, the service manager 114 may authenticate itself with the CSP control infrastructure 102. In some aspects, the service manager 114 may initiate a session based at least in part on logging-in into the CSP control infrastructure 102 by utilizing the unique combination of the username and/or the password. Further, the service manager 114 may provide identification information that identifies the service manager 114.

In this case, as shown by reference numeral 340, the CSP control infrastructure 102 may determine, based at least in part on receiving the unique combination of the username and/or the password associated with the manager account and/or the identification information, that the service manager 114 associated with the manager account has initiated the session. In this case, the CSP control infrastructure 102 may determine a session token for the session initiated by the service manager 114. Further, the CSP control infrastructure 102 may retrieve the manager public key and the encrypted manager private key associated with the service manager 114 and/or the manager account. The CSP control infrastructure 102 may transmit the encrypted manager private key to the service manager 114.

The CSP control infrastructure 102 may authenticate the service manager 114 to provide access. In some aspects, the CSP control infrastructure 102 may enable (e.g., activate functionality and/or provide script for) the web application 118 to receive the master password associated with the service manager 114. The web application 118 may enable the graphical user interface to receive the master password. Based at least in part on the web application 118 receiving the master password, the CSP control infrastructure 102 may enable (e.g., activate functionality and/or provide script for) the web application 118 to determine the master key, and to utilize the master key to decrypt the encrypted manager private key. Based at least in part on decrypting the encrypted manager private key, the service manager 114 may utilize the manager private key to sign manager requests during the active session.

As shown by reference numeral 345, the service manager 114 may utilize the web application 118 to transmit a manager request to an application programming interface (API) associated with the CSP control infrastructure 102. In some aspects, the manager request may be associated with requesting an action to be performed in connection with managing the distributed network services. The service manager 114 may utilize the web application 118 to transmit the manager request, which may include an Internet protocol (IP) packet. In some aspects, the IP packet may enable the service manager 114 to, for example, call a function related to the action to be performed in connection with managing the distributed network services. Some examples of actions to be performed in connection with managing the distributed network services include registering one or more subordinate manager devices/accounts, registering one or more user devices (e.g., user devices 102) associated with the service manager 114, reviewing user data associated with usage of network services by user devices associated with the service manager 114, reviewing financial information, or the like.

In some aspects, to enable authorization of the manager request with the CSP control infrastructure 102, the service manager 114 may include a web token in the IP packet. The web token may include information to be utilized by the CSP control infrastructure 102 to authorize the manager request. Such information may include, for example, identification information regarding the service manager 114, information regarding a point in time when the web token was created, information regarding a point in time when the web token was signed and/or transmitted, or a combination thereof. In an example, the service manager 114 may include the web token in a header included in the IP packet. In another example, the service manager 114 may include the web token in a payload included in the IP packet. In some aspects, the web token may include a JSON web token (JWT). Further, the service manager 114 may sign the request by using the manager private key.

In some aspects, every manager request from the service manager 114 may be authorized by the CSP control infrastructure 102. In other words, for every manager request, the service manager 114 may determine and transmit a respective IP packet including a respective web token, with the manager request being signed by using the manager private key.

Based at least in part on receiving the manager request, as shown by reference numeral 350, the CSP control infrastructure 102 may authorize the manager request. In some aspects, the CSP control infrastructure 102 may receive the IP packet and may extract the web token from the header or the payload included in the IP packet.

Further, the CSP control infrastructure 102 may determine whether the session associated with the service manager is still active. The CSP control infrastructure may also determine, based at least in part on the information regarding the points in time in the manager request, that the manager request was determined during the active session. When the CSP control infrastructure 102 determines that the session associated with the service manager is still active and/or that the manager request was determined during the active session and/or that the manager request was signed and/or that the manager request was transmitted during the active session, the CSP control infrastructure may utilize the retrieved manager public key to authorize the manager request.

When the manager request is signed using the manager private key, that is associated with the manager public key, the CSP control infrastructure 102 may successfully authorize the signed manager request. In this case, the CSP control infrastructure 102 may determine that the service manager 114 is authorized to make the manager request. As a result, the CSP control infrastructure 102 may enable the service manager 114 to perform the requested action and/or the CSP control infrastructure 102 may perform the requested action.

In some aspects, the service manager 114 may enable manager devices associated with the service manager 114 (e.g., administrative personnel, employees, etc. associated with the service manager 114) to set up subordinate manager accounts related to the manager account associated with the service manager 114. Each subordinate manager account may be set up in a similar and/or analogous manner as the manager account. In an example, each subordinate manager account may be associated with a respective subordinate manager key pair, subordinate master password, etc. Further, each subordinate manager account may transmit the respective subordinate manager public key and an encrypted respective subordinate manager private key to the CSP control infrastructure 102, as discussed above with respect to the service manager 114. In some aspects, the subordinate manager accounts may have different levels of access to the CSP control infrastructure 102. In an example, a subordinate manager account associated with administrative personnel may have access to the CSP control infrastructure 102 to perform administrative functions associated with accounts (e.g., manager account, subordinate manager accounts, etc.) associated with the service manager 114. In another example, a subordinate manager account associated with an employee may have access to the CSP control infrastructure 102 to perform employee functions associated with employment of the employee at the service manager 114.

In this way, by utilizing the optimized access control, as discussed herein, the CSP control infrastructure may mitigate instances of a malicious party gaining unauthorized access to the CSP control infrastructure, the service distributor, the service manager, and/or the user devices. Further, the CSP control infrastructure may mitigate instances of private information associated with the user devices becoming compromised. As a result, the optimized access control may enable efficient utilization of resources (e.g., processing resources, management resources, memory resources, bandwidth resources, network resources, financial resources, power consumption resources, battery life, or the like) by the CSP control infrastructure, the service distributor, the service manager, and/or the user devices for more suitable tasks.

As indicated above, FIG. 3 is provided as an example. Other examples may differ from what is described with regard to FIG. 3.

FIG. 4 is an illustration of an example flow 400 associated with providing optimized header information to enable access control, according to various aspects of the present disclosure. The example flow 400 may include a CSP control infrastructure (e.g., CSP control infrastructure 102) and a service manager (e.g., service manager 114) in communication with each other over a network 126. The CSP control infrastructure 102 may include a processing unit 104 and a security database 106 to enable provision of the network services. The service manager 114 may include a processing unit 116 and a web application 118 to enable access by the service manager 114 to the CSP control infrastructure 102 and/or to enable receipt of the network services.

As discussed above with respect to FIG. 3, the service manager 114 may utilize the web application 118 to determine a manager request including an IP packet. Further, as discussed above with respect to FIG. 3, the service manager 114 may utilize the web application 118 to sign the manager request by using the manager private key. In some aspects, signing the manager request may be associated with determining the IP packet including custom headers. In an example, the custom headers may include a signature header and/or a timestamp header.

As shown by reference numeral 410, the service manager 114 may utilize the web application 118 to determine the signature header and/or the timestamp header. The signature header may indicate a message, which may include timestamp information and/or action description information and/or path information. In some aspects, the timestamp information may utilize a time system (e.g., UNIX time system) to describe a point in time. In an example, the timestamp information may identify a point in time when the manager request and/or the signature header is determined by the service manager 114. In another example, the timestamp information may identify a point in time when the manager request and/or the signature header is determined and/or signed by the service manager 114.

In some aspects, the action description information may describe the action to be performed in connection with managing the distributed network services. In an example, the action description information may indicate a type of the action to be performed. Some examples of types of actions may include a get-type action for retrieving data from a database associated with the CSP control infrastructure 102, a post-type action for creating data and/or providing data to be stored in the database associated with the CSP control infrastructure 102, a put-type action for updating a threshold amount of data associated with managing the distributed network services, a patch-type action for updating a nominal amount of data (e.g., a subset of the amount of available data) associated with managing the distributed network services, and/or a delete-type action for deleting data from the database associated with the CSP control infrastructure 102.

In some aspects, the path information may describe a path to be navigated by the CSP control infrastructure 102 to enable performance of the action described by the action description information. In an example, when the action description information indicates that the get-type action is to be performed, the path information may indicate a version of an API and/or a function associated with the API to be utilized (e.g., called) by the CSP control infrastructure 102 to retrieve data. Additionally, or alternatively, the path information may identify a device and/or an account (e.g., a subordinate manager device or/account, user device/account) for which data is to be retrieved. Similarly, when the action description information indicates that the delete-type action is to be performed, the path information may indicate a version of an API and/or a function associated with the API to be utilized (e.g., called) by the CSP control infrastructure 102 to delete data. Additionally, or alternatively, the path information may identify a device and/or an account (e.g., a subordinate manager device or/account, user device/account) for which data is to be deleted. In some aspects, the version of the API may be indicated to enable performance of a given type of action that requires utilization of, for example, an older version of the API because a newer version of the API may not be compatible with performance of the given type of action.

Based at least in part on determining the message including the timestamp information and/or the action description information and/or the path information, the service manager 114 may utilize the web application 118 to sign the message. In some aspects, the service manager 114 may sign the message by using the manager private key. Additionally, the service manager 114 may utilize an encoding algorithm (e.g., Base64 encoding algorithm) to encode the signed message to determine a corresponding string of alphanumeric characters that represent the signed message.

Further, the service manager 114 may utilize the web application 118 to determine the timestamp header. In some aspects, the service manager 114 may include in the timestamp header the timestamp information included in the signature header. As a result, the timestamp header may identify a point in time when the manager request and/or the signature header is determined by the service manager 114 and/or may identify a point in time when the manager request and/or the signature header is determined and/or signed by the service manager 114.

Based at least in part on determining the signature header and/or the timestamp header, as shown by reference numeral 420, the service manager 114 may determine the manager request. In an example, as discussed elsewhere herein, the service manager 114 may determine the IP packet included in the manager request. Further, the service manager 114 may include the signature header and/or the timestamp header in a header field of the IP packet. As shown by reference numeral 430, the service manager 114 may transmit the manager request to the CSP control infrastructure 102.

Based at least in part on receiving the manager request, as shown by reference numeral 440, the CSP control infrastructure 102 may authorize the manager request. In some aspects, the CSP control infrastructure 102 may receive the IP packet included in the manager request. Further, the CSP control infrastructure 102 may analyze the header field included in the IP packet to receive the signature header and/or the timestamp header.

Based at least in part on receiving the timestamp header, the CSP control infrastructure 102 may determine the identified point in time when the manager request and/or the signature header was determined by the service manager 114 and/or the identified point in time when the manager request and/or the signature header was determined and/or signed by the service manager 114. Further, the CSP control infrastructure 102 may compare the identified point in time with a current time associated with the receipt and/or authorizing of the manager request by the CSP control infrastructure 102. When a difference between the identified point in time and the current time satisfies a predetermined duration of time (e.g., the difference is less than or equal to the predetermined duration of time), the CSP control infrastructure 102 may determine that the manager request was timely received within the predetermined duration of time (e.g., 30 seconds, 60 seconds, 90 seconds, or the like). To address a discrepancy in time being measured at the service manager 114 and time being measured at the CSP control infrastructure 102, the CSP control infrastructure 102 may determine the predetermined duration of time to include a tolerance of, for example, 15 seconds.

Alternatively, when the difference between the identified point in time and the current time fails to satisfy the predetermined duration of time (e.g., the difference is greater than the predetermined duration of time), the CSP control infrastructure 102 may decline to authorize the manager request. In this case, the CSP control infrastructure 102 may discard the received manager request.

Based at least in part on timely receiving the manager request, the CSP control infrastructure 102 may receive the message indicated and/or included in the signature header. Further, the CSP control infrastructure 102 may utilize the manager public key to authenticate the signed message, as discussed elsewhere herein. In some aspects, the CSP control infrastructure 102 and the service manager 114 may secretly pre-share the action description information and/or the path information. In this case, the CSP control infrastructure may recreate the message based at least in part on utilizing the timestamp information received in the timestamp header, the secretly pre-shared action description information, and/or the secretly pre-shared path information. Based at least in part on recreating the message, the CSP control infrastructure 102 may utilize the manager public key to authorize the signature header.

Based at least in part on authorizing the signed message, the CSP control infrastructure 102 may receive the timestamp information included in the message. The CSP control infrastructure 102 may compare the timestamp information included in the message with the timestamp information included in the timestamp header. When the timestamp information included in the message matches (e.g., is the same as) the timestamp information included in the timestamp header, the CSP control infrastructure 102 may determine that the timestamp header and the signature header were determined at substantially the same time and/or in association with each other. In this case, the CSP control infrastructure 102 may successfully authorize the manager request.

Based at least in part on successfully authorizing the manager request, the CSP control infrastructure 102 may receive the action description information and/or the path information. Further, the CSP control infrastructure 102 may enable performance of the action described in the action description information in association with the path information. In an example, based at least in part on determining the action to be performed, the CSP control infrastructure 102 may utilize the indicated version of the API and/or the function associated with the API to enable performance of the action. In some aspects, the CSP control infrastructure 102 may transmit an authorization message to the service manager 114 indicating successful authorization of the manager request.

In this way, by utilizing the optimized access control, as discussed herein, the CSP control infrastructure may mitigate instances of a malicious party gaining unauthorized access to the CSP control infrastructure, the service distributor, the service manager, and/or the user devices. Further, the CSP control infrastructure may mitigate instances of private information associated with the user devices becoming compromised. As a result, the optimized access control may enable efficient utilization of resources (e.g., processing resources, management resources, memory resources, bandwidth resources, network resources, financial resources, power consumption resources, battery life, or the like) by the CSP control infrastructure, the service distributor, the service manager, and/or the user devices for more suitable tasks.

FIG. 5 is an illustration of an example flow 500 associated with providing an optimized access control system, according to various aspects of the present disclosure. The example flow 500 may include a CSP control infrastructure (e.g., CSP control infrastructure 102) and one or more user devices (e.g., user device 120) in communication with each other over a network 126. The CSP control infrastructure 102 may include a processing unit 104 and a security database 106 to enable provision of the network services. A user device 120 may include a processing unit 122 and a web application 124 to enable access by the user device 120 to the CSP control infrastructure 102 and/or to enable reception of the network services.

In some aspects, the web application 124 may enable the user device 120 to receive information to be processed by the web application 124 and/or by the CSP control infrastructure 102. The web application 124 may include a graphical user interface to receive the information via a local input interface (e.g., touch screen, keyboard, mouse, pointer, etc.) associated with the user device 120. The information may be received via text input or via a selection from among a plurality of options (e.g., pull down menu, etc.). In some aspects, the web application 124 may activate and/or enable, at an appropriate time, the graphical interface for receiving the information. For instance, the web application 124 may cause a screen (e.g., local screen) associated with the user device 120 to display, for example, a pop-up message to request entry of the information. Further, the web application 124 may enable transmission of at least a portion of the information to the CSP control infrastructure 102. In some aspects, the web application 124 may utilize a processing unit (e.g., processing unit 106, processor 920) associated with the user device 120 to perform processes/operations associated with the optimized access control.

In some aspects, as discussed elsewhere herein, the service distributor 108 may establish a business relationship with the service manager 114 for managing provision of the distributed network services to the one or more user devices 120. The service manager 114 may manage allocation of the network services among the one or more user devices 120. The one or more user devices 120 may receive tiered network services. For instance, a user device 120 may receive tier-1 network services (e.g., all available network services) while another user device 120 may receive tier-2 network services (e.g., a subset of all available network services).

The CSP control infrastructure 102 may enable optimized control access by the user device 120 to the CSP control infrastructure 102. In some aspects, as shown by reference numeral 505, the CSP control infrastructure 102 may receive user information associated with a user device 120 from the service manager 114. Such user information may include, for example, identification information, contact information (e.g., a phone number, an email address, or the like), financial information (e.g., bank account number), or a combination thereof.

Based at least in part on receiving the user information, as shown by reference numeral 510, the CSP control infrastructure 102 may determine and transmit an invitation link to the user device 120. The CSP control infrastructure 102 may utilize the contact information (e.g., email address) associated with the user device 120 to transmit the invitation link. The invitation link may include a uniform resource locator (URL) associated with a uniform resource identifier (URI).

In some aspects, the invitation link may include a static portion and a dynamic portion. In an example, the invitation link may be in the form of (static portion)(dynamic portion). The static portion may remain constant for invitation links determined with respect to inviting user devices (e.g., user device 120) to access the CSP control infrastructure 102. In some aspects, the CSP control infrastructure 102 may configure the static portion to include routing information to enable routing of the user device 120 to a server associated with the CSP control infrastructure 102.

The dynamic portion may be time-specific and/or recipient-specific (e.g., unique to the user device 120). When the dynamic portion is time-specific, the CSP control infrastructure 102 may determine the time-specific dynamic portion to include a unique time identifier identifying a point in time utilizing, for example, a UNIX time system (e.g., Epoch time, Posix time, etc.). In some aspects, the identified point in time may be associated with a point in time when the invitation link is determined. In some aspects, the identified point in time may be associated with a point in time and/or a duration of time indicating an expiration time before which the invitation link is to be activated by the user device 120 to access the CSP control infrastructure 102. In some aspects, when the dynamic portion is time-specific, the invitation link may be configured to be utilized a limited number of times. In some aspects, the invitation link may include rate-limiting properties such that the invitation link may be utilized the limited number of times prior to the expiration time. The rate-limiting properties may also mitigate instances of a malicious party gaining unauthorized access via the invitation link (e.g., guess, brute force, etc.). In an example, the CSP control infrastructure 102 may determine the unique time identifier based at least in part on encoding information indicating the identified point in time, the limited number of times, and/or the rate limiting properties into a unique string of alphanumeric and/or special characters.

When the dynamic portion is recipient-specific, the CSP control infrastructure 102 may determine the recipient-specific dynamic portion based at least in part on determining a unique recipient identifier that identifies the user device 120. To determine the unique recipient identifier, the CSP control infrastructure 102 may utilize at least a portion of the identification information received along with the user information from the service manager 114. In an example, the CSP control infrastructure 102 may encode the identification information into a unique string of alphanumeric and/or special characters to determine the unique recipient identifier.

In some aspects, the invitation link may be in the form of, for example, https://CSPcontrolinfrastructure.com/webview/ U74obUbN2et6fYKqd70vNHRV XoONh4wyrUqg= where https://CSPcontrolinfrastructure.com/webview/ may include the static portion and U74obUbN2et6fYKqd 70vNHRVXoUKDaWICgONh4wyrUqg=may be the dynamic portion (e.g., unique time identifier and/or unique recipient identifier).

In some aspects, the CSP control infrastructure 102 may correlate and store information included in the invitation link in association with the user information associated with the user device 120. In this way, when the invitation link is activated, the CSP control infrastructure 102 may determine that the invitation link was activated by the user device 120. Further, when the invitation link is activated, the CSP control infrastructure 102 may verify whether the invitation link was activated in compliance with the expiration time and/or in compliance with the limited number of times and/or in compliance with the rate-limiting properties.

Based at least in part on receiving the invitation link, as shown by reference numeral 515, the user device 120 may activate the invitation link to access the CSP control infrastructure 102. In some aspects, the user device 120 may utilize the web application 124 to activate the invitation link. In this case, the CSP control infrastructure 102 may determine that the invitation link was activated by the user device 120 and may verify that the invitation link was activated in compliance with the expiration time and/or in compliance with the limited number of times and/or in compliance with the rate-limiting properties, as discussed elsewhere herein.

Based at least in part on activating the link, the user device 120 may set up a user account with the CSP control infrastructure 102. To set up the user account, the user device 120 may utilize the web application 124. In some aspects, the user device 120 may set up a login system including registering a unique combination of a username and/or a password in association with the user account. In some aspects, the CSP control infrastructure 102 may associate the user account associated with the user device 120 with the service manager 114 and/or the service distributor 108. As a result, the service manager 114 and/or the service distributor 108 may have authorized access to review information associated with network services received by the user device 120.

Based at least in part on the user device 120 setting up the user account, as shown by reference numeral 520, the CSP control infrastructure 102 may enable the user device 120 to determine authorization information. In an example, when the web application 124 includes a client application configured and provided by the CSP control infrastructure 102, the CSP control infrastructure 102 may transmit activation information (e.g., enabling information) to activate a configured functionality within the client application to determine the authorization information. In another example, when the web application 124 includes a web browser, the CSP control infrastructure 102 may transmit a script (e.g., enabling information) to be executed by the web browser on the user device 120 to determine the authorization information. In some aspects, the CSP control infrastructure may transmit unique information (e.g., identification information, contact information, etc., or a combination thereof) associated with the user device 120 to be used as seed information for determining the authorization information, thereby enabling the authorization information to be unique to the user device 120.

The authorization information may include, for example, an asymmetric user key pair, a master password, and/or a master key. For instance, based at least in part on receiving the seed information, as shown by reference numeral 525, the user device 120 may determine an asymmetric user key pair associated with the user device 120 and/or the user account. In other words, the user key pair may be unique to the user device 120 and/or the user account. The user key pair may include a user public key and a user private key. The user public key and the user private key may be associated with each other via, for example, a mathematical function. As a result, data encrypted using the user public key may be decrypted by utilizing the user private key. Further, data signed using the user private key may be validated by utilizing the user public key.

The user device 120 may also determine the master password including a master string of alphanumeric characters. In some aspects, the user device 120 may receive the master string via user input. In some aspects, the master string may be based at least in part on the seed information and may be unique to the user device 120 and/or the user account. Based at least in part on receiving the master string, the user device 120 may utilize the web application 124 to determine a master key. In some aspects, the user device 120 may utilize a key derivation function to determine the master key based at least in part on the master string. The key derivation function may perform password hashing to determine the master key. The web application 124 may utilize the master key to encrypt the user private key.

Further, the user device 120 may determine an asymmetric group key pair associated with a group of user devices including the user device 120. In some aspects, the group key pair may be unique to the group. The group key pair may include a group public key and a group private key. The group public key and the group private key may be associated with each other via, for example, a mathematical function. As a result, data encrypted using the group public key may be decrypted by utilizing the group private key. Further, data signed using the group private key may be validated by utilizing the group public key. The web application 124 may utilize the user public key to encrypt the group private key.

As shown by reference numeral 530, the user device 120 may transmit, and the CSP control infrastructure 102 may receive, at least a portion of the information determined by the user device 120. For instance, the user device 120 may transmit, for example, the user public key, the encrypted user private key, the group public key, and/or the encrypted group private key to the CSP control infrastructure 102. The CSP control infrastructure 102 may store the received information in association with the user information and/or the user device 102 and/or the user account associated with the user device 120.

When the user device 120 is to access the CSP control infrastructure 102, as shown by reference numeral 535, the user device 120 may authenticate itself with the CSP control infrastructure 102. In some aspects, the user device 120 may initiate a session based at least in part on logging-in into the CSP control infrastructure 102 by utilizing the unique combination of the username and/or the password. Further, the user device 120 may provide identification information that identifies the user device 120.

In this case, the CSP control infrastructure 102 may determine, based at least in part on receiving the unique combination of the username and/or the password associated with the user account and/or the identification information, that the user device 120 associated with the user account has initiated the session. In this case, the CSP control infrastructure 102 may determine a session token for the session initiated by the user device 120. Further, the CSP control infrastructure 102 may retrieve the user public key, the encrypted user private key, the group public key, and/or the encrypted group private key associated with the user information and/or the user device 102 and/or the user account associated with the user device 120. The CSP control infrastructure 102 may transmit the encrypted user private key and/or the encrypted group private key to the user device 120.

As shown by reference numeral 540, the CSP control infrastructure 102 may authorize the user device 120 to provide access. In some aspects, the CSP control infrastructure 102 may enable (e.g., activate functionality and/or provide script for) the web application 124 to receive the master password associated with the user device 120. The web application 124 may enable the graphical user interface to receive the master password. Based at least in part on receiving the master password, the CSP control infrastructure 102 may enable (e.g., activate functionality and/or provide script for) the web application 124 to determine the master key, and to utilize the master key to decrypt the encrypted user private key. Based at least in part on decrypting the encrypted user private key, the user device 120 may utilize the user private key to sign user requests during the active session. In this case, the user device 120 may have authorized access to receive the network services.

In some aspects, the user device 120 may sign and transmit user requests to receive the network services. In an example, the user device 120 may sign and transmit a user request to receive data storage and protection services. For instance, the user device may sign and transmit a user request to store encrypted content in a memory (e.g., security database 106) associated with the CSP control infrastructure 102. In some aspects, the CSP control infrastructure 102 may be a stateless infrastructure such that the CSP control infrastructure 102 may not have access to unencrypted content and/or unencrypted private keys. The content may include any information including, for example, alphanumeric information, digital documents, audio files, video files, image files, or a combination thereof.

To store the encrypted content associated with the user, the user device 120 may utilize the user public key to encrypt, for example, a symmetric cryptographic key utilized to encrypt the content. When the user device 120 is to decrypt the stored encrypted content, the user device 120 may sign and transmit a user request (e.g., see block 545) to the CSP control infrastructure 102 to provide the stored encrypted content and/or encrypted keys. In this case, the user request may be signed by utilizing the user private key. Based at least in part on receiving the stored encrypted content and/or encrypted keys, the web application 124 may be enabled by the CSP control infrastructure 102, as discussed elsewhere herein, to utilize the master password and related keys to decrypt the encrypted user private key, decrypt the encrypted symmetric cryptographic key, and to decrypt the encrypted content.

To store encrypted content associated with the group, the user device 120 may utilize the group public key to encrypt a symmetric cryptographic key utilized to encrypt the content. When the user device 120 is to decrypt the stored encrypted content, the user device 120 may sign and transmit a group request (e.g., see block 545) to the CSP control infrastructure 102 to provide the stored encrypted content and/or encrypted keys. In this case, the user device 102 may utilize the user private key to decrypt the group private key and may utilize the group private key to sign the group request. Based at least in part on receiving the stored encrypted content and/or encrypted keys, the web application 124 may be enabled by the CSP control infrastructure 102, as discussed elsewhere herein, to utilize the master password and related keys to decrypt the encrypted group private key, decrypt the encrypted symmetric cryptographic key, and to decrypt the encrypted content.

As shown by reference numeral 545, the user device 120 may utilize the web application 124 to transmit a user request and/or a group request to an application programming interface (API) associated with the CSP control infrastructure 102. In some aspects, the user request and/or a group request may be associated with requesting an action to be performed in connection with receiving the network services. The user device 120 may utilize the web application 124 to transmit the user request and/or a group request, which may include an Internet protocol (IP) packet. In some aspects, the IP packet may enable the user device 120 to, for example, call a function related to the action to be performed in connection with receiving the network services. Some examples of actions to be performed in connection with receiving the network services include registering one or more subordinate user devices/accounts, storing and/or retrieving encrypted contents and/or encrypted keys associated with the user device 120, storing and/or retrieving encrypted contents and/or encrypted keys associated with a group including the user device 120, changing a master password, or the like.

In some aspects, to enable authorization of the user request and/or group request with the CSP control infrastructure 102, the user device 120 may include a web token in the IP packet. The web token may include authentication information to be utilized by the CSP control infrastructure 102 to authorize the user request and/or group request. Such authentication information may include, for example, identification information regarding the user device 120, information regarding a point in time when the web token was created, information regarding a point in time when the web token was signed and/or transmitted, or a combination thereof. In an example, the user device 120 may include the web token in a header included in the IP packet. In another example, the user device 120 may include the web token in a payload included in the IP packet. In some aspects, the web token may include a JSON web token (JWT). Further, the user device 120 may sign the user request by using the user private key, and may sign the group request by using the user private key and/or the group private key.

In some aspects, every user request and/or group request from the user device 120 may be authorized by the CSP control infrastructure 102. In other words, for every user request and/or a group request, the user device 120 may determine and transmit a respective IP packet including a respective web token, with the user request and/or a group request being signed by using the user private key or the group private key.

Based at least in part on receiving the user request and/or group request, as shown by reference numeral 550, the CSP control infrastructure 102 may authorize the user request and/or group request. In some aspects, the CSP control infrastructure 102 may receive the IP packet and may extract the web token from the header or the payload included in the IP packet.

Further, the CSP control infrastructure 102 may determine whether the session associated with the user device 120 is still active. The CSP control infrastructure may also determine, based at least in part on the information regarding the points in time in the user request and/or a group request, that the user request and/or group request was determined during the active session. When the CSP control infrastructure 102 determines that the session associated with the user device 120 is still active and/or that the user request and/or a group request was determined during the active session and/or that the user request and/or a group request was signed and/or transmitted during the active session, the CSP control infrastructure 102 may utilize the retrieved user public key and/or group public to authorize the user request.

When the user request is signed using the user private key that is associated with the user public key and/or the group request is signed using the group private key that is associated with the group public key, the CSP control infrastructure 102 may successfully authorize the signed user request and/or a group request. In this case, the CSP control infrastructure 102 may determine that the user device 120 is authorized to make the user request and/or a group request. As a result, the CSP control infrastructure 102 may enable the user device 120 to perform the requested action and/or the CSP control infrastructure 102 may perform the requested action.

In some aspects, the user device 120 may enable subordinate user devices associated with the user device 120 (e.g., administrative personnel, employees, etc. associated with the user device 120) to set up subordinate user accounts related to the user account associated with the user device 120. Each subordinate user account may be set up in a similar and/or analogous manner as the user account. In an example, each subordinate user account may be associated with a respective subordinate user key pair, subordinate master password, etc. Further, each subordinate user account may transmit the respective subordinate user public key and an encrypted respective subordinate user private key to the CSP control infrastructure 102, as discussed above with respect to the user device 120. In some aspects, the subordinate user accounts may have different levels of access to the CSP control infrastructure 102. In an example, a subordinate user account associated with administrative personnel may have access to the CSP control infrastructure 102 to perform administrative functions associated with accounts (e.g., user account, subordinate user accounts, etc.) associated with the user device 120. In another example, a subordinate user account associated with an employee may have access to the CSP control infrastructure 102 to perform employee functions associated with employment of the employee.

In this way, by utilizing the optimized access control, as discussed herein, the CSP control infrastructure may mitigate instances of a malicious party gaining unauthorized access to the CSP control infrastructure, the service distributor, the service manager, and/or the user devices. Further, the CSP control infrastructure may mitigate instances of private information associated with the user devices becoming compromised. As a result, the optimized access control may enable efficient utilization of resources (e.g., processing resources, management resources, memory resources, bandwidth resources, network resources, financial resources, power consumption resources, battery life, or the like) by the CSP control infrastructure, the service distributor, the service manager, and/or the user devices for more suitable tasks.

FIG. 6 is an illustration of an example process 600 associated with providing an optimized access control system, according to various aspects of the present disclosure. In some aspects, the process 600 may be performed by memories and/or processors/controllers (e.g., processing unit 104, processing unit 122, processor 920) associated with an infrastructure device (e.g., CSP control infrastructure 102) and/or a user device (e.g., user device 120). As shown by reference numeral 610, process 600 may include transmitting, by an infrastructure device to a user device, an invitation link to enable the user device to receive network services from the infrastructure device. For instance, the infrastructure device may utilize an associated communication interface (e.g., communication interface 970) with the associated memory and/or processor to transmit, to a user device, an invitation link to enable the user device to receive network services from the infrastructure device, as discussed elsewhere herein.

As shown by reference numeral 620, process 600 may include transmitting, by the infrastructure device to the user device based at least in part on verifying that the invitation link was activated by the user device, seed information to enable the user device to determine authentication information. For instance, the infrastructure device may utilize the associated communication interface, memory, and/or processor to transmit, to the user device based at least in part on verifying that the invitation link was activated by the user device, seed information to enable the user device to determine authentication information, as discussed elsewhere herein.

As shown by reference numeral 630, process 600 may include determining, by the user device, the authentication information based at least in part on utilizing the seed information. For instance, the user device may utilize the associated memory and/or processor to determine the authentication information based at least in part on utilizing the seed information, as discussed elsewhere herein.

As shown by reference numeral 640, process 600 may include transmitting, by the user device to the infrastructure device during a communication session, a user request related to an action to be performed regarding receiving the network services, the user request being signed based at least in part on utilizing a first portion of the authentication information. For instance, the user device may utilize the associated communication interface, memory, and/or processor to transmit, to the infrastructure device during a communication session, a user request related to an action to be performed regarding receiving the network services, the user request being signed based at least in part on utilizing a first portion of the authentication information, as discussed elsewhere herein.

As shown by reference numeral 650, process 600 may include authorizing, by the infrastructure device, the user request based at least in part on verifying that the communication session is currently active. For instance, the infrastructure device may utilize the associated communication interface, memory, and/or processor to authorize the user request based at least in part on verifying that the communication session is currently active, as discussed elsewhere herein.

Process 600 may include additional aspects, such as any single aspect or any combination of aspects described below and/or in connection with one or more other processes described elsewhere herein.

In a first aspect, in process 600, authorizing the user request includes the infrastructure device authorizing the user request based at least in part on verifying that the user request was determined by the user device during the communication session.

In a second aspect, alone or in combination with the first aspect, in process 600, authorizing the user request includes the infrastructure device authorizing the user request based at least in part on verifying that the user request was signed by the user device during the communication session.

In a third aspect, alone or in combination with the first through second aspects, in process 600, authorizing the user request includes the infrastructure device authorizing the user request based at least in part on utilizing a second portion of the authentication information, the second portion being different from the first portion.

In a fourth aspect, alone or in combination with the first through third aspects, in process 600, determining the authentication information includes the user device determining a master string of alphanumeric characters, and a master key based at least in part on the master string of alphanumeric characters.

In a fifth aspect, alone or in combination with the first through fourth aspects, in process 600, transmitting the seed information includes the infrastructure device transmitting the seed information in association with enabling information to enable the user device to determine the authentication information.

In a sixth aspect, alone or in combination with the first through fifth aspects, in process 600, transmitting the seed information includes the infrastructure device transmitting information unique to the user device.

Although FIG. 6 shows example blocks of the process, in some aspects, the process may include additional blocks, fewer blocks, different blocks, or differently arranged blocks than those depicted in FIG. 6. Additionally, or alternatively, two or more of the blocks of the process may be performed in parallel.

As indicated above, FIG. 6 is provided as an example. Other examples may differ from what is described with regard to FIG. 6.

FIG. 7 is an illustration of an example process 700 associated with improved access control for network services, according to various aspects of the present disclosure. In some aspects, the process 700 may be performed by a memory and/or a processor/controller (e.g., processing unit 102, processor 920) associated with an infrastructure device (e.g., CSP control infrastructure 102). As shown by reference numeral 710, process 700 may include transmitting, by an infrastructure device to a user device, an invitation link to enable the user device to receive network services from the infrastructure device. For instance, the infrastructure device may utilize an associated communication interface (e.g., communication interface 670) with the associated memory and/or processor to transmit, to a user device, an invitation link to enable the user device to receive network services from the infrastructure device, as discussed elsewhere herein.

As shown by reference numeral 720, process 700 may include transmitting, by the infrastructure device to the user device based at least in part on the user device activating the invitation link, seed information to be utilized by the user device to determine authentication information. For instance, the infrastructure device may utilize the associated communication interface, memory, and/or processor to transmit, to the user device based at least in part on the user device activating the invitation link, seed information to be utilized by the user device to determine authentication information, as discussed elsewhere herein.

As shown by reference numeral 730, process 700 may include receiving, by the infrastructure device from the user device during an active communication session, a user request related to an action to be performed regarding receiving the network services, the user request being signed based at least in part on utilizing a first portion of the authentication information. For instance, the infrastructure device may utilize the associated communication interface, memory, and/or processor to receive, from the user device during an active communication session, a user request related to an action to be performed regarding receiving the network services, the user request being signed based at least in part on utilizing a first portion of the authentication information, as discussed elsewhere herein.

As shown by reference numeral 740, process 700 may include enabling, by the infrastructure device, performance of the action regarding receiving the network services based at least in part on verifying that the communication session is currently active. For instance, the user device may utilize the associated memory and/or processor to enable performance of the action regarding receiving the network services based at least in part on verifying that the communication session is currently active, as discussed elsewhere herein.

Process 700 may include additional aspects, such as any single aspect or any combination of aspects described below and/or in connection with one or more other processes described elsewhere herein.

In a first aspect, in process 700, enabling performance of the action includes enabling performance of the action based at least in part on verifying that the user request was determined by the user device during the communication session.

In a second aspect, alone or in combination with the first aspect, in process 700, enabling performance of the action includes enabling performance of the action based at least in part on verifying that the user request was signed by the user device during the communication session.

In a third aspect, alone or in combination with the first through second aspects, in process 700, enabling performance of the action includes enabling performance of the action based at least in part on utilizing a second portion of the authentication information, the second portion being different from the first portion.

In a fourth aspect, alone or in combination with the first through third aspects, in process 700, transmitting the seed information includes transmitting the seed information in association with enabling information to enable the user device to determine the authentication information.

In a fifth aspect, alone or in combination with the first through fourth aspects, in process 700, transmitting the seed information includes transmitting information unique to the user device.

In a sixth aspect, alone or in combination with the first through fifth aspects, process 700 may include verifying that the invitation link was activated by the user device.

Although FIG. 7 shows example blocks of the process, in some aspects, the process may include additional blocks, fewer blocks, different blocks, or differently arranged blocks than those depicted in FIG. 7. Additionally, or alternatively, two or more of the blocks of the process may be performed in parallel.

As indicated above, FIG. 7 is provided as an example. Other examples may differ from what is described with regard to FIG. 7.

FIG. 8 is an illustration of an example process 800 associated with improved access control for network services, according to various aspects of the present disclosure. In some aspects, the process 800 may be performed by a memory and/or a processor/controller (e.g., processing unit 110, processor 920) associated with a user device (e.g., user device 120) executing a web application. As shown by reference numeral 810, process 800 may include receiving, by a user device from an infrastructure device, an invitation link to enable the user device to receive network services from the infrastructure device. For instance, the manager device may utilize an associated communication interface with the associated memory and/or processor to receive, from an infrastructure device, an invitation link to enable the user device to receive network services from the infrastructure device, as discussed elsewhere herein.

As shown by reference numeral 820, process 800 may include receiving, by the user device from the infrastructure device based at least in part on the user device activating the invitation link, seed information to be utilized by the user device to determine authentication information. For instance, the manager device may utilize the associated communication interface, memory, and/or processor to receive, from the infrastructure device based at least in part on the user device activating the invitation link, seed information to be utilized by the user device to determine authentication information, as discussed elsewhere herein.

As shown by reference numeral 830, process 800 may include transmitting, by the user device to the infrastructure device during an active communication session and based at least in part on determining the authentication information, a user request related to an action to be performed regarding receiving the network services, a portion of the user request being signed based at least in part on utilizing a first portion of the authentication information. For instance, the manager device may utilize the associated communication interface, memory, and/or processor to transmit, to the infrastructure device during an active communication session and based at least in part on determining the authentication information, a user request related to an action to be performed regarding receiving the network services, a portion of the user request being signed based at least in part on utilizing a first portion of the authentication information, as discussed elsewhere herein.

As shown by reference numeral 840, process 800 may include performing, by the user device, the action regarding receiving the network services based at least in part on a verification that the communication session is currently active. For instance, the manager device may utilize the associated memory and/or processor to perform the action regarding receiving the network services based at least in part on a verification that the communication session is currently active, as discussed elsewhere herein.

Process 800 may include additional aspects, such as any single aspect or any combination of aspects described below and/or in connection with one or more other processes described elsewhere herein.

In a first aspect, in process 800, performing the action includes performing the action includes performing the action based at least in part on a verification that the user request was determined by the user device during the communication session.

In a second aspect, alone or in combination with the first aspect, in process 800, performing the action includes performing the action based at least in part on a verification that the user request was signed by the user device during the communication session.

In a third aspect, alone or in combination with the first through second aspects, in process 800, performing the action includes performing the action based at least in part on a verification of the user request by utilizing a second portion of the authentication information, the second portion being different from the first portion.

In a fourth aspect, alone or in combination with the first through third aspects, in process 800, determining the authentication information includes determining a master string of alphanumeric characters, and a master key based at least in part on the master string of alphanumeric characters.

In a fifth aspect, alone or in combination with the first through fourth aspects, in process 800, receiving the seed information includes receiving the seed information in association with enabling information to enable the user device to determine the authentication information.

In a sixth aspect, alone or in combination with the first through fifth aspects, in process 800, receiving the seed information includes receiving unique information associated with the user device to enable the authentication information to be unique to the user device.

Although FIG. 8 shows example blocks of the process, in some aspects, the process may include additional blocks, fewer blocks, different blocks, or differently arranged blocks than those depicted in FIG. 8. Additionally, or alternatively, two or more of the blocks of the process may be performed in parallel.

As indicated above, FIG. 8 is provided as an example. Other examples may differ from what is described with regard to FIG. 8.

FIG. 9 is an illustration of example devices 900 associated with providing an optimized access control system, according to various aspects of the present disclosure. In some aspects, the example devices 900 may form part of or implement the systems, servers, environments, infrastructures, components, devices, or the like described elsewhere herein (e.g., control infrastructure, distributor device, manager device, user device, etc.) and may be used to perform example processes described elsewhere herein. The example devices 900 may include a universal bus 910 communicatively coupling a processor 920, a memory 930, a storage component 940, an input component 950, an output component 960, and a communication interface 970.

Bus 910 may include a component that permits communication among multiple components of a device 900. Processor 920 may be implemented in hardware, firmware, and/or a combination of hardware and software. Processor 920 may take the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some aspects, processor 920 may include one or more processors capable of being programmed to perform a function. Memory 930 may include a random access memory (RAM), a read only memory (ROM), and/or another type of dynamic or static storage device (e.g., a flash memory, a magnetic memory, and/or an optical memory) that stores information and/or instructions for use by processor 920.

Storage component 940 may store information and/or software related to the operation and use of a device 900. For example, storage component 940 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 950 may include a component that permits a device 900 to receive information, such as via user input (e.g., a touch screen display, a keyboard, a keypad, a mouse, a button, a switch, and/or a microphone). Additionally, or alternatively, input component 950 may include a component for determining location (e.g., a global positioning system (GPS) component) and/or a sensor (e.g., an accelerometer, a gyroscope, an actuator, another type of positional or environmental sensor, and/or the like). Output component 960 may include a component that provides output information from device 900 (via, for example, a display, a speaker, a haptic feedback component, an audio or visual indicator, and/or the like).

Communication interface 970 may include a transceiver-like component (e.g., a transceiver, a separate receiver, a separate transmitter, and/or the like) that enables a device 900 to communicate with other devices, such as via a wired connection, a wireless connection, or a combination of wired and wireless connections. Communication interface 970 may permit device 900 to receive information from another device and/or provide information to another device. For example, communication interface 970 may include an Ethernet interface, an optical interface, a coaxial interface, an infrared interface, a radio frequency (RF) interface, a universal serial bus (USB) interface, a Wi-Fi interface, a cellular network interface, and/or the like.

A device 900 may perform one or more processes described elsewhere herein. A device 900 may perform these processes based on processor 920 executing software instructions stored by a non-transitory computer-readable medium, such as memory 930 and/or storage component 940. As used herein, the term "computer-readable medium" may refer to a non-transitory memory device. A memory device may include memory space within a single physical storage device or memory space spread across multiple physical storage devices.

Software instructions may be read into memory 930 and/or storage component 940 from another computer-readable medium or from another device via communication interface 970. When executed, software instructions stored in memory 930 and/or storage component 940 may cause processor 920 to perform one or more processes described elsewhere herein. Additionally, or alternatively, hardware circuitry may be used in place of or in combination with software instructions to perform one or more processes described elsewhere herein. Thus, implementations described herein are not limited to any specific combination of hardware circuitry and software.

The quantity and arrangement of components shown in FIG. 9 are provided as an example. In practice, a device 900 may include additional components, fewer components, different components, or differently arranged components than those shown in FIG. 9. Additionally, or alternatively, a set of components (e.g., one or more components) of a device 900 may perform one or more functions described as being performed by another set of components of a device 900.

As indicated above, FIG. 9 is provided as an example. Other examples may differ from what is described with regard to FIG. 9.

Persons of ordinary skill in the art will appreciate that the aspects encompassed by the present disclosure are not limited to the particular exemplary aspects described herein. In that regard, although illustrative aspects have been shown and described, a wide range of modification, change, and substitution is contemplated in the foregoing disclosure. It is understood that such variations may be made to the aspects without departing from the scope of the present disclosure. Accordingly, it is appropriate that the appended claims be construed broadly and in a manner consistent with the present disclosure.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" or "device" is intended to be broadly construed as hardware, firmware, or a combination of hardware and software. As used herein, a processor is implemented in hardware, firmware, or a combination of hardware and software.

As used herein, satisfying a threshold may, depending on the context, refer to a value being greater than the threshold, greater than or equal to the threshold, less than the threshold, less than or equal to the threshold, equal to the threshold, or not equal to the threshold, among other examples, or combinations thereof.

It will be apparent that systems or methods described herein may be implemented in different forms of hardware, firmware, or a combination of hardware and software. The actual specialized control hardware or software code used to implement these systems or methods is not limiting of the aspects. Thus, the operation and behavior of the systems or methods were described herein without reference to specific software code—it being understood that software and hardware can be designed to implement the systems or methods based, at least in part, on the description herein.

Even though particular combinations of features are recited in the claims or disclosed in the specification, these combinations are not intended to limit the disclosure of various aspects. In fact, many of these features may be combined in ways not specifically recited in the claims or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (for example, a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   transmitting, by an infrastructure device to a user device, an invitation link to enable the user device to receive network services from the infrastructure device;
   transmitting, by the infrastructure device to the user device based at least in part on verifying that the invitation link was activated by the user device, seed information to enable the user device to determine authentication information;
   determining, by the user device, the authentication information based at least in part on utilizing the seed information;
   transmitting, by the user device to the infrastructure device during a communication session, a user request related to an action to be performed regarding receiving the network services, the user request being signed based at least in part on utilizing a first portion of the authentication information; and
   authorizing, by the infrastructure device, the user request based at least in part on verifying that the communication session is currently active.

2. The method of claim 1, wherein authorizing the user request includes the infrastructure device authorizing the user request based at least in part on verifying that the user request was determined by the user device during the communication session.

3. The method of claim 1, wherein authorizing the user request includes the infrastructure device authorizing the user request based at least in part on verifying that the user request was signed by the user device during the communication session.

4. The method of claim 1, wherein authorizing the user request includes the infrastructure device authorizing the user request based at least in part on utilizing a second portion of the authentication information, the second portion being different from the first portion.

5. The method of claim 1, wherein determining the authentication information includes the user device determining a master string of alphanumeric characters, and a master key based at least in part on the master string of alphanumeric characters.

6. The method of claim 1, wherein transmitting the seed information includes the infrastructure device transmitting the seed information in association with enabling information to enable the user device to determine the authentication information.

7. The method of claim 1, wherein transmitting the seed information includes the infrastructure device transmitting information unique to the user device.

8. A system, comprising:
   an infrastructure device; and
   a user device configured to receive network services from the infrastructure device, wherein
      the infrastructure device is configured to transmit, to the user device, an invitation link to enable the user device to receive the network services from the infrastructure device,
      the infrastructure device is configured to transmit, to the user device based at least in part on verifying that the invitation link was activated by the user device, seed information to enable the user device to determine authentication information,
      the user device is configured to determine the authentication information based at least in part on utilizing the seed information,
      the user device is configured to transmit, to the infrastructure device during a communication session, a user request related to an action to be performed regarding receiving the network services, the user request being signed based at least in part on utilizing a first portion of the authentication information; and
      the infrastructure device is configured to authorize the user request based at least in part on verifying that the communication session is currently active.

9. The system of claim 8, wherein, to authorize the user request, the infrastructure device is configured to verify that the user request was determined by the user device during the communication session.

10. The system of claim 8, wherein, to authorize the user request, the infrastructure device is configured to verify that the user request was signed by the user device during the communication session.

11. The system of claim 8, wherein, to authorize the user request, the infrastructure device is configured to authorize the user request based at least in part on utilizing a second portion of the authentication information, the second portion being different from the first portion.

12. The system of claim 8, wherein, to determine the authentication information, the user device is configured to determine a master string of alphanumeric characters, and a master key based at least in part on the master string of alphanumeric characters.

13. The system of claim 8, wherein, to transmit the seed information, the infrastructure device is configured to transmit the seed information in association with enabling information to enable the user device to determine the authentication information.

14. The system of claim 8, wherein, to transmit the seed information, the infrastructure device is configured to transmit information unique to the user device.

15. A non-transitory computer-readable medium configured to store instructions, which when executed by an infrastructure device or a user device configured to receive network services from the infrastructure device, cause:

the infrastructure device to transmit, to the user device, an invitation link to enable the user device to manage network services provided by the infrastructure device;

the infrastructure device to transmit, to the user device based at least in part on verifying that the invitation link was activated by the user device, seed information to enable the user device to determine authentication information;

the user device to determine the authentication information based at least in part on utilizing the seed information;

the user device to transmit, to the infrastructure device during a communication session, a user request related to an action to be performed regarding receiving the network services, the user request being signed based at least in part on utilizing a first portion of the authentication information; and the infrastructure device to authorize the user request based at least in part on verifying that the communication session is currently active.

16. The non-transitory computer-readable medium of claim 15, wherein, to authorize the user request, the infrastructure device is configured to verify that the user request was determined by the user device during the communication session.

17. The non-transitory computer-readable medium of claim 15, wherein, to authorize the user request, the infrastructure device is configured to verify that the user request was signed by the user device during the communication session.

18. The non-transitory computer-readable medium of claim 15, wherein, to authorize the user request, the infrastructure device is configured to authorize the user request based at least in part on utilizing a second portion of the authentication information, the second portion being different from the first portion.

19. The non-transitory computer-readable medium of claim 15, wherein, to determine the authentication information, the user device is configured to determine a master string of alphanumeric characters, and a master key based at least in part on the master string of alphanumeric characters.

20. The non-transitory computer-readable medium of claim 15, wherein, to transmit the seed information, the infrastructure device is configured to transmit the seed information in association with enabling information to enable the user device to determine the authentication information.

* * * * *